United States Patent [19]

(12) United States Patent
Zhu et al.

(10) Patent No.: US 11,678,029 B2
(45) Date of Patent: Jun. 13, 2023

(54) VIDEO LABELING METHOD AND APPARATUS, DEVICE, AND COMPUTER-READABLE STORAGE MEDIUM

(71) Applicant: Tencent Technology (Shenzhen) Company Limited, Shenzhen (CN)

(72) Inventors: Chengwei Zhu, Shenzhen (CN); Zixun Sun, Shenzhen (CN); Xiao Chen, Shenzhen (CN); Wentao Yao, Shenzhen (CN); Tingtian Li, Shenzhen (CN); Zirui Tu, Shenzhen (CN); Shuang Zhao, Shenzhen (CN); Li Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/528,084

(22) Filed: Nov. 16, 2021

(65) Prior Publication Data

US 2022/0078530 A1    Mar. 10, 2022

Related U.S. Application Data

(63) Continuation of application No. PCT/CN2020/121398, filed on Oct. 16, 2020.

(30) Foreign Application Priority Data

Dec. 17, 2019    (CN) .......................... 20191130063.5

(51) Int. Cl.
*H04N 21/854*    (2011.01)
*H04N 21/84*    (2011.01)
(Continued)

(52) U.S. Cl.
CPC ......... *H04N 21/854* (2013.01); *H04N 21/431* (2013.01); *H04N 21/4756* (2013.01); *H04N 21/485* (2013.01); *H04N 21/84* (2013.01)

(58) Field of Classification Search
CPC ............... H04N 21/854; H04N 21/431; H04N 21/4756; H04N 21/485; H04N 21/84
(Continued)

(56) References Cited

U.S. PATENT DOCUMENTS 8,494,234 B1    7/2013    Bozinovic et al.
11,089,345 B2 *    8/2021    Solaro ................ H04N 21/4755
(Continued)

FOREIGN PATENT DOCUMENTS

CN    101021897 A    8/2007
CN    101080028 A    11/2007
(Continued)

OTHER PUBLICATIONS

Tencent Technology, ISR, PCT/CN2020/121398, Jan. 20, 2021, 3 pgs.
(Continued)

*Primary Examiner* — Dominic D Saltarelli
(74) *Attorney, Agent, or Firm* — Morgan, Lewis & Bockius LLP

(57)    ABSTRACT

This application provides a video labeling method performed by a server, and the method includes: receiving a video extraction instruction transmitted by a terminal, and obtaining a to-be-extracted video according to the video extraction instruction; extracting event information from video frames of the to-be-extracted video; forming at least one event information flow by using the event information; capturing, based on the at least one event information flow, at least one first clip that meets a plot trigger condition from the to-be-extracted video and obtaining a plot labeling tag of (Continued)

the at least one first clip; and transmitting the at least one first clip and the corresponding plot labeling tag to the terminal, wherein the terminal displays the at least one first clip and the corresponding plot labeling tag in a preset display region of a display interface in which the to-be-extracted video is displayed.

20 Claims, 20 Drawing Sheets

(51) Int. Cl.
*H04N 21/485* (2011.01)
*H04N 21/475* (2011.01)
*H04N 21/431* (2011.01)

(58) Field of Classification Search
USPC .......................................................... 725/32
See application file for complete search history.

(56) References Cited

U.S. PATENT DOCUMENTS

| | | | |
|---|---|---|---|
| 2014/0006921 A1 | 1/2014 | Gopinath et al. | |
| 2019/0251361 A1* | 8/2019 | Chen | H04N 21/8456 |
| 2020/0293255 A1* | 9/2020 | Lim | G06V 10/242 |
| 2020/0302182 A1* | 9/2020 | Ahn | H04N 21/251 |

FOREIGN PATENT DOCUMENTS

| | | |
|---|---|---|
| CN | 102638654 A | 8/2012 |
| CN | 103049885 A | 4/2013 |
| CN | 103914810 A | 7/2014 |
| CN | 104754267 A | 7/2015 |
| CN | 105100892 A | 11/2015 |
| CN | 105763884 A | 7/2016 |
| CN | 106127684 A | 11/2016 |
| CN | 107820138 A | 3/2018 |
| CN | 108833936 A | 11/2018 |
| CN | 108924604 A | 11/2018 |
| CN | 108933970 A | 12/2018 |
| CN | 109299326 A | 2/2019 |
| CN | 109657100 A | 4/2019 |
| CN | 110381371 A | 10/2019 |
| CN | 110996138 A | 4/2020 |
| EP | 1675400 A1 | 6/2006 |

OTHER PUBLICATIONS

Tencent Technology, WO, PCT/CN2020/121398, Jan. 20, 2021, 5 pgs.
Tencent Technology, IPRP, PCT/CN2020/121398, May 17, 2022, 6 pgs.

* cited by examiner

Small map image 13-1

Small map image of which a resolution has been enhanced 13-2

```
{
  '_id': '1647',
  'v_id': '',
  'ret_hero_msg': {
    'blue': {
      {'location': [668, 307,], 'life_value': 10, 'level': 4},
        },
    },
  'ret_broadcast': {
    'broadcast_id': 1,
    'broadcast_text': 'defeat',
    'winner': {
      'hero_id': 2618,
      'hero_name': 'human name-1',
      'camp': 'red'
      },
    'loser': {
      'hero_id': 2572,
      'hero_name': 'human name-2',
      'camp': 'blue'
      }
    },
  'ret_grass': {
    'blue': {
      {'in_grass': 0},
      {'in_grass': 0}
      }
    },
    'ret_tower': {
    'red': {
      '1': [799, 170]
      },
    'blue': {}
}
```

FIG. 15

VIDEO LABELING METHOD AND APPARATUS, DEVICE, AND COMPUTER-READABLE STORAGE MEDIUM

CROSS-REFERENCE TO RELATED APPLICATIONS

This application is a continuation application of PCT Patent Application No. PCT/CN2020/121398, entitled "VIDEO ANNOTATION METHOD AND APPARATUS, DEVICE, AND COMPUTER-READABLE STORAGE MEDIUM" filed on Oct. 16, 2020, which claims priority to Chinese Patent Application No. 201911304063.5, filed with the State Intellectual Property Office of the People's Republic of China on Dec. 17, 2019, and entitled "VIDEO LABELING METHOD, DEVICE, AND STORAGE MEDIUM", all of which are incorporated herein by reference in their entirety.

FIELD OF THE TECHNOLOGY

This application relates to a video processing technology, and in particular, to a video labeling method and apparatus, a device, and a computer-readable storage medium.

BACKGROUND OF THE DISCLOSURE

Video labeling refers to labeling a wonderful clip in a video (e.g., a video clip that has been watched and/or commented more frequently than other portions of the video by at least a certain number of times) and obtaining a labeled title of the wonderful clip, to allow a user to choose to play the wonderful clip according to the labeled title, which is convenient for the user to view the wonderful clip in the video within a limited viewing time. In the related art, there are three common video labeling manners, that is, labeling is performed according to a playback amount, labeling is performed according to an operation data of a video (for example, a wonderful clip is labeled by using game operation data corresponding to a game video), and labeling is performed according to comment information in a video playing process (for example, a wonderful clip is extracted according to bullet comment data).

However, when the wonderful clip is labeled by using the playback amount, the playback amount of the video at each moment needs to be counted, and workload is enormous, resulting in relatively low video labeling efficiency; when the wonderful clip is labeled by using the operation data corresponding to the video, due to difference between video obtaining channels, some videos may lack operation data corresponding to the videos. In this case, video labeling efficiency is low; and when the wonderful clip is labeled by using the comment information, the wonderful clip is limited by reference value of the comment information, and when the reference value of the comment information is relatively low, the video labeling efficiency is also relatively low.

SUMMARY

Embodiments of this application provide a video labeling method and apparatus, a device, and a computer-readable storage medium, which can improve video labeling efficiency.

The technical solutions in the embodiments of this application are implemented as follows:

The embodiments of this application provide a video labeling method performed by a server, the method including:

receiving, by a server, a video extraction instruction transmitted by a terminal, and obtaining a to-be-extracted video according to the video extraction instruction;

extracting, by the server, event information from video frames of the to-be-extracted video, the event information representing basic elements forming plot content of the to-be-extracted video;

forming, by the server, at least one event information flow by using the event information; and capturing, by the server based on the at least one event information flow, at least one first clip that meets a plot trigger condition from the to-be-extracted video, and obtaining a plot labeling tag of the at least one first clip, the plot labeling tag being used for labeling the at least one first clip; and transmitting the at least one first clip and the corresponding plot labeling tag to the terminal, wherein the terminal displays the at least one first clip and the corresponding plot labeling tag in a preset display region of a display interface in which the to-be-extracted video is displayed.

The embodiments of this application provide a server, including:

a memory, configured to store executable video labeling instructions; and a processor, configured to implement, when executing the executable video labeling instructions stored in the first memory, the video labeling method provided by a server side according to the embodiments of this application.

The embodiments of this application provide a non-transitory computer-readable storage medium, storing executable video labeling instructions, the executable video labeling instructions, when being executed by a first processor, implementing the video labeling method video provided by a server side according to the embodiments of this application, or when being executed by a second processor, implementing the video labeling method provided by a terminal side according to the embodiments of this application.

In the embodiments of this application, a server can receive a video extraction instruction transmitted by a terminal, then obtain a to-be-extracted video according to the video extraction instruction, subsequently extract event information from video frames of the to-be-extracted video, subsequently form at least one event information flow by using the obtained event information, and finally capture, based on the at least one event information flow, at least one first clip that meets a plot trigger condition from the to-be-extracted video and obtain a plot labeling tag of the at least one first clip; and the terminal receives the at least one first clip and the plot labeling tag transmitted by the server, subsequently obtains labeled information obtained by correspondingly labeling the at least one first clip by using the plot labeling tag, and further displays the labeled information in a display region, to complete a video labeling process of the to-be-extracted video. Therefore, wonderful clips that meet a condition can be recognized from the to-be-extracted video by using image content in the video frames of the to-be-extracted video, and the wonderful clips are captured and labeled, to improve video labeling efficiency.

BRIEF DESCRIPTION OF THE DRAWINGS

FIG. 15 is an exemplary diagram of structured information according to an embodiment of this application.

DESCRIPTION OF EMBODIMENTS

Figure 1:
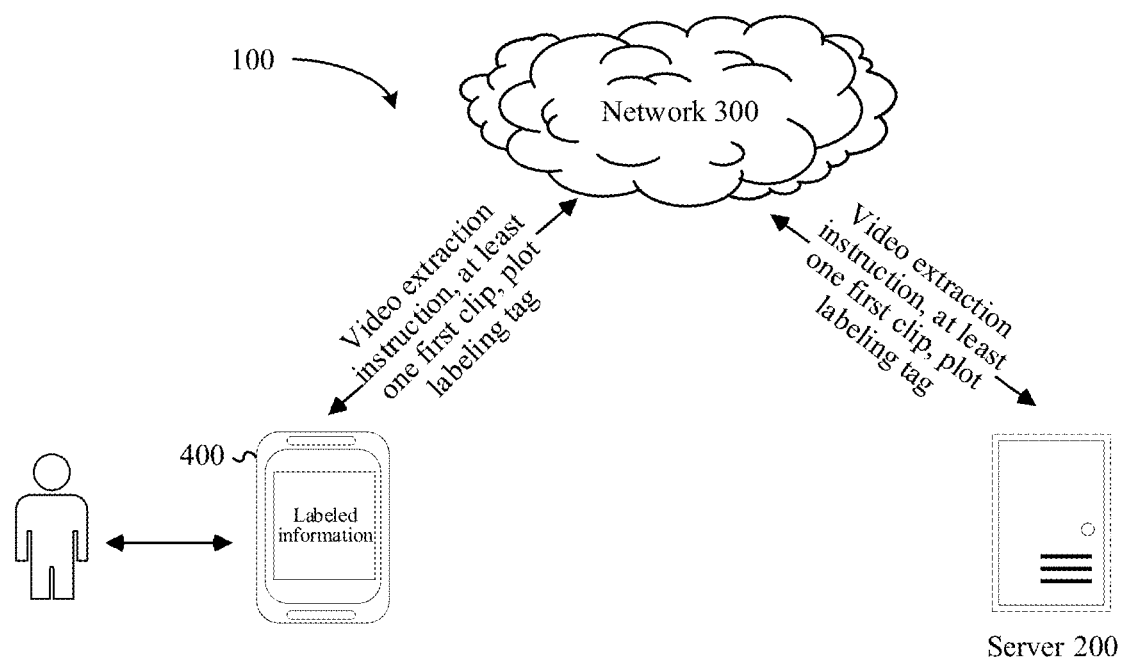
FIG. 1 is an exemplary schematic architectural diagram of a video labeling system according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, "some embodiments" describe subsets of all possible embodiments, but it may be understood that the "some embodiments" may be the same subset or different subsets of all the possible embodiments, and can be combined with each other without conflict.

In the following descriptions, the included term "first/second" intended to distinguish similar objects but does not necessarily indicate a specific order of an object. It may be understood that "first/second" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as that usually understood by a person skilled in the technical field to which this application belongs. In this application, terms used in the specification of this application are merely intended to describe objectives of the specific embodiments, but are not intended to limit this application.

Before the embodiments of this application are further described in detail, a description is made on terms involved in the embodiments of this application, and the terms involved in the embodiments of this application are applicable to the following explanations.

(1) First clip, refers to a clip with relatively high viewing value in a video, and may be understood as a wonderful clip in the video. Compared with other clips in the video, the first clip usually includes key content of the clip or content that an audience prefers to watch, for example, team fight content in an e-sport game video content and a plot turning point in a TV play.

(2) Event information, represents basic elements forming plot content of a video, for example, a time, a character, a location, a character behavior, and a consequence. The event information may be extracted from a video frame.

(3) Event information flow, refers to an information flow obtained by arranging event information in a plurality of video frames according to an order of the video frames. The event information flow can describe events occurring in a video.

(4) Event detection model, is a model configured to detect event information in a video frame. Image processing is performed on the video frame by using the event detection model, to recognize the event information in the video frame. For example, a character role and the like in video frames of a TV play may be recognized by using the event detection model.

(5) Video image feature point, refers to a structure that can describe a feature of a video frame, for example, an intersection between two edges in the video frame and a point in which a grayscale value changes drastically in the video frame. Event information in the video frame can be recognized by matching video image feature points.

Video labeling refers to labeling a wonderful clip in a video and obtaining a labeled title of the wonderful clip, to allow a user to choose to play the wonderful clip according to the labeled title, so that the user cannot miss the wonderful clip in the video within a limited viewing time. In the related art, there are three common video labeling manners, that is, labeling is performed by using a playback amount, labeling is performed by using an operation time of a video, and labeling is performed by using comment information in a video playing process.

When labeling is performed according to the playback amount, a playback amount of a video at each moment needs to be first obtained, a moment at which a playback amount is maximum in the video is extracted, then a storyboard clip to which the moment at which the playback amount is maximum belongs is found in the video, and further a wonderful clip in the video is labeled according to the storyboard clip. However, in this manner, the playback amount of the video at each moment needs to be counted, and workload is enormous, resulting in relatively low video labeling efficiency.

When a wonderful clip is labeled by using operation data corresponding to a video, operation data of a program corresponding to the video needs to be obtained, and then the wonderful clip is determined according to the operation data. For example, when a wonderful clip is extracted by using operation data of a game corresponding to a game video, a start moment and an end moment of the wonderful clip are first determined according to the operation data of the game, and then the wonderful clip is captured from the video according to the start moment and the end moment. However, the application scope of the manner is relatively narrow, and for some videos that do not have corresponding operation data, availability for obtaining a wonderful clip is relatively low. For example, a game video, a movie video, or the like uploaded by a user may not have corresponding operation data, resulting in reduction of the video labeling efficiency.

When a wonderful clip is labeled by using comment information, comment information such as bullet comment information of a video at each moment is first obtained, and then a video clip of which comment information meets a requirement is used as a wonderful clip, to label the wonderful clip in the video. However, when the wonderful clip is labeled in this manner, it heavily relies on reference value of the comment information. When reference value of comment information is relatively low, or some videos do not have comment information, availability for labeling a wonderful clip by using the comment information is relatively low, resulting in relatively low video labeling efficiency.

The embodiments of this application provide a video labeling method and apparatus, a device, and a computer-readable storage medium, which can improve the video labeling efficiency. An exemplary application of a video labeling device provided in the embodiments of this application is described below, and the video labeling device provided in the embodiments of this application may be implemented as various types of user terminals such as a smartphone, a tablet computer, and a notebook computer, or may be implemented as a server. An exemplary application when the video labeling device is respectively implemented as a server and a terminal and video labeling is completed through cooperative operation between the server and the terminal is described below. The server may be an independent server, or may be a server cluster or a distributed system formed by a plurality of physical servers, or may be a basic cloud server for providing a cloud service, a cloud database, cloud computing, a cloud function, cloud storage, a network service, cloud communication, a middleware service, a domain name service, a security service, a CDN, and a big data and artificial intelligence platform, and the like. The terminal may be a smartphone, a tablet computer, a notebook computer, a desktop computer, a smart speaker, a smartwatch, or the like, but is not limited thereto.

FIG. 1 is an exemplary schematic architectural diagram of a video labeling system 100 according to an embodiment of this application. To support a video labeling application, a terminal 400 is connected to a server 200 through a network 300, and the network 300 may be a wide area network or a local area network or a combination of a wide area network and a local area network.

The terminal 400 transmits a video extraction instruction to the server 200 through the network 300, the video extraction instruction specifying a to-be-extracted video on which video extraction needs to be performed. After receiving the video extraction instruction transmitted by the terminal 400, the server 200 obtains a to-be-extracted video according to the video extraction instruction. Then, the server 200 extracts event information from video frames of the to-be-extracted video, the event information representing basic elements forming plot content of the to-be-extracted video. Next, the server 200 forms at least one event information flow by using the event information, a sequence of event information in the event information flow being the same as a sequence of the video frames. Subsequently, the server 200 captures, based on the at least one event information flow, at least one first clip that meets a plot trigger condition from the to-be-extracted video and obtains a plot labeling tag of the at least one first clip, to label the at least one first clip by using the plot labeling tag. Subsequently, the server 200 returns the at least one first clip and the corresponding plot labeling tag to the terminal 400 through the network 300, and after receiving the at least one first clip and the corresponding plot labeling tag transmitted by the server 200, the terminal 400 obtains labeled information of the at least one first clip, the labeled information being obtained by correspondingly labeling the at least one first clip by using the plot labeling tag. Finally, when displaying the to-be-extracted video, the terminal 400 displays the labeled information in a display region, the display region being a first preset region in a display interface for displaying the to-be-extracted video.

Figure 2:
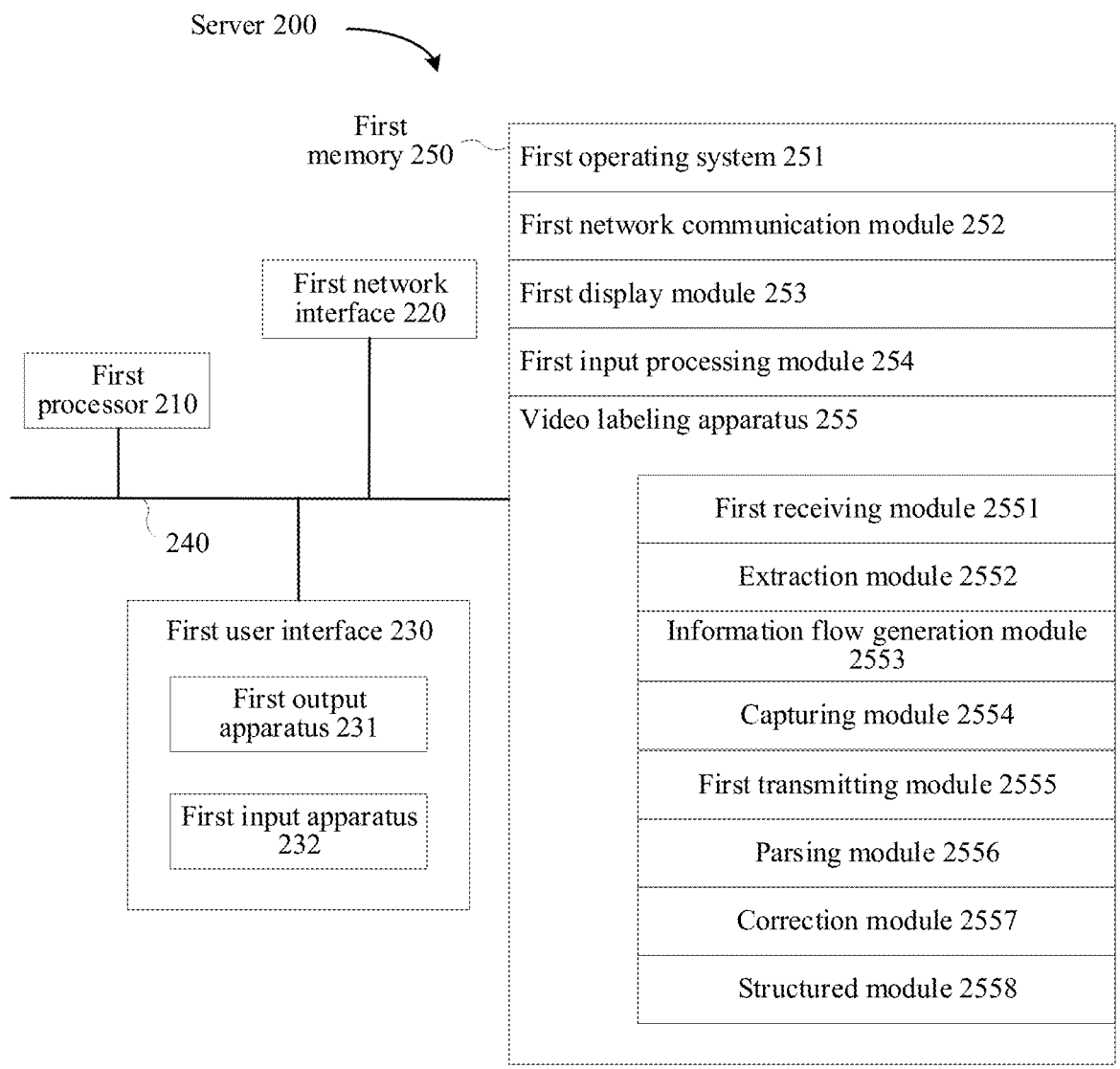
FIG. 2 is an exemplary schematic structural diagram of a server in FIG. 1 according to an embodiment of this application.

FIG. 2 is an exemplary schematic structural diagram of a server 200 in FIG. 1 according to an embodiment of this application. The server 200 shown in FIG. 2 includes: at least one first processor 210, a first memory 250, at least one first network interface 220, and a first user interface 230. Components in the server 200 are coupled together by using a first bus system 240. It may be understood that the first bus system 240 is configured to implement connection and communication between the components. In addition to a data bus, the first bus system 240 further includes a power supply bus, a control bus, and a status signal bus. However, for ease of clear description, all types of buses are labeled as the first bus system 240 in FIG. 2.

The first processor 210 may be an integrated circuit chip, and has a signal processing capability, for example, a general-purpose processor, a digital signal processor (DSP), or another programmable logical device, a discrete gate or a transistor logical device, or a discrete hardware component. The general-purpose processor may be a microprocessor, any conventional processor, or the like.

The first user interface 230 includes one or more first output devices 231 that can display media content, including one or more speakers and/or one or more visual display screens. The first user interface 230 further includes one or more first input apparatuses 232, including a user interface component helping a user input, for example, a keyboard, a mouse, a microphone, a touch display screen, a camera, or another input button and control.

The first memory 250 include a volatile memory or a non-volatile memory, or may include a volatile memory and a non-volatile memory. The non-volatile memory may be a read-only memory (ROM), and the volatile memory may be a random access memory (RAM). The first memory 250 described in this embodiment of this application is to include any suitable type of memories. The first memory 250 optionally includes one or more storage devices that are physically far away from the first processor 210.

In some embodiments, the first memory 250 can store data to support various operations. Examples of the data include a program, a module, a data structure, or a subset or a superset thereof. The following provides descriptions by using examples.

A first operating system 251 includes a system program configured to process various basic system services and perform a hardware-related task, for example, a framework layer, a core library layer, and a driver layer, and is configured to implement various basic services and process a hardware-related task.

A first network communication module 252 is configured reach another computing device through one or more (wired or wireless) first network interfaces 220. Exemplary first network interfaces 220 include: Bluetooth, wireless compatible authentication (WIFI), a universal serial bus (USB), and the like.

A first display module 253 is configured to display information by using a first output apparatus 231 (for example, a display screen or a speaker) associated with one or more first user interfaces 230 (for example, a user interface configured to operate a peripheral device and display content and information).

A first input processing module 254 is configured to detect one or more user inputs or interactions from one of the one or more first input apparatuses 232 and translate the detected input or interaction.

In some embodiments, the video labeling apparatus provided in this embodiment of this application may be implemented by using software. FIG. 2 shows a video labeling apparatus 255 stored in the first memory 250. The apparatus may be software in a form such as a program and a plug-in, and includes the following software modules: a first receiving module 2551, an extraction module 2552, an information flow generation module 2553, a capturing module 2554, a first transmitting module 2555, a parsing module 2556, a correction module 2557, and a structured module 2558. The following describes a function of each module.

In some other embodiments, the video labeling apparatus provided in this embodiment of the application may be implemented by using hardware. For example, the video labeling apparatus provided in this embodiment of the application may be a processor in a form of a hardware decoding processor, programmed to perform the video labeling method provided in the embodiments of the application. For example, the processor in the form of a hardware decoding processor may use one or more application-specific integrated circuits (ASIC), a DSP, a programmable logic device (PLD), a complex programmable logic device (CPLD), a field-programmable gate array (FPGA), or other electronic components.

For example, the embodiments of this application provide a server, including:

a first memory, configured to store executable video labeling instructions; and a first processor, configured to implement, when executing the executable video labeling instructions stored in the first memory, the video labeling method provided by a server side according to the embodiments of this application.

Figure 3:
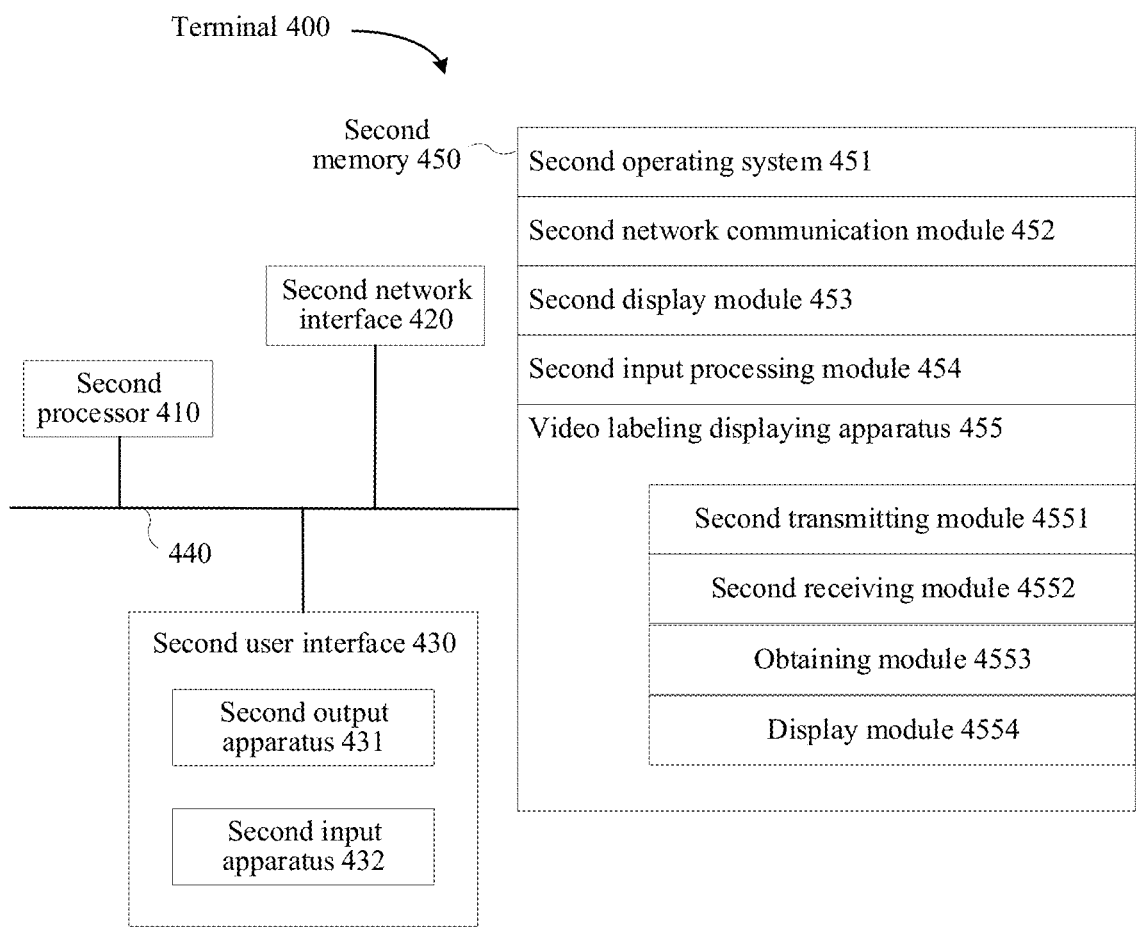
FIG. 3 is an exemplary schematic flowchart of a terminal in FIG. 1 according to an embodiment of this application.

FIG. 3 is an exemplary schematic structural diagram of a terminal 400 in FIG. 1 according to an embodiment of this application. The terminal 400 shown in FIG. 3 includes: at least one second processor 410, a second memory 450, at least one second network interface 420, and a second user interface 430. All components in the terminal 400 are coupled together by using a second bus system 440. It may be understood that the second bus system 440 is configured to implement connection and communication between the components. In addition to a data bus, the second bus system 440 further includes a power supply bus, a control bus, and a status signal bus. However, for ease of clear description, all types of buses are labeled as the second bus system 440 in FIG. 3.

The second processor 410 may be an integrated circuit chip, and has a signal processing capability, for example, a general-purpose processor, a DSP, or another programmable logical device, a discrete gate or a transistor logical device, or a discrete hardware component. The general-purpose processor may be a microprocessor, any conventional processor, or the like.

The second user interface 430 includes one or more second output devices 431 that can display media content, including one or more speakers and/or one or more visual display screens. The second user interface 430 further includes one or more second input apparatuses 432, including a user interface component helping a user input, for example, a keyboard, a mouse, a microphone, a touch display screen, a camera, or another input button and control.

The second memory 450 includes a volatile memory or a non-volatile memory, or may include a volatile memory and a non-volatile memory. The non-volatile memory may be a ROM, and the volatile memory may be a RAM. The second memory 450 described in this embodiment of this application is to include any suitable type of memories. The second memory 450 optionally includes one or more storage devices that are physically far away from the second processor 410.

In some embodiments, the second memory 450 can store data to support various operations. Examples of the data include a program, a module, a data structure, or a subset or a superset thereof. The following provides descriptions by using examples.

A second operating system 451 includes a system program configured to process various basic system services and perform a hardware-related task, for example, a framework layer, a core library layer, and a driver layer, and is configured to implement various basic services and process a hardware-related task.

A second network communication module 452 is configured to reach another computing device through one or more (wired or wireless) second network interfaces 420. Exemplary second network interfaces 420 include: Bluetooth, wireless compatible authentication (WIFI), a USB, and the like.

A second display module 453 is configured to display information by using a second output apparatus 431 (for example, a display screen or a speaker) associated with one or more second user interfaces 430 (for example, a user interface configured to operate a peripheral device and display content and information).

A second input processing module 454 is configured to detect one or more user inputs or interactions from one of the one or more second input apparatuses 432 and translate the detected input or interaction.

In some embodiments, the video labeling displaying apparatus provided in this embodiment of this application may be implemented by using software. FIG. 3 shows a video labeling displaying apparatus 455 stored in the second memory 450. The apparatus may be software in a form such as a program and a plug-in, and includes the following software modules: a second transmitting module 4551, a second receiving module 4552, an obtaining module 4553, and a displaying module 4554. The following describes a function of each module.

In some other embodiments, the video labeling displaying apparatus provided in this embodiment of the application may be implemented by using hardware. For example, the video labeling displaying apparatus provided in this embodiment of the application may be a processor in a form of a hardware decoding processor, programmed to perform the video labeling method provided in the embodiments of the application. For example, the processor in the form of a hardware decoding processor may use one or more ASICs, a DSP, a PLD, a CPLD, an FPGA, or other electronic components.

For example, the embodiments of this application provide a terminal, including:

a second memory, configured to store executable video labeling instructions; and a second processor, configured to implement, when executing the executable video labeling instructions stored in the second memory, the video labeling method provided by a terminal side according to the embodiments of this application.

The video labeling method provided in the embodiments of the application is described with reference to an exemplary application and implementation of the video labeling device provided in the embodiments of the application.

Figure 4:
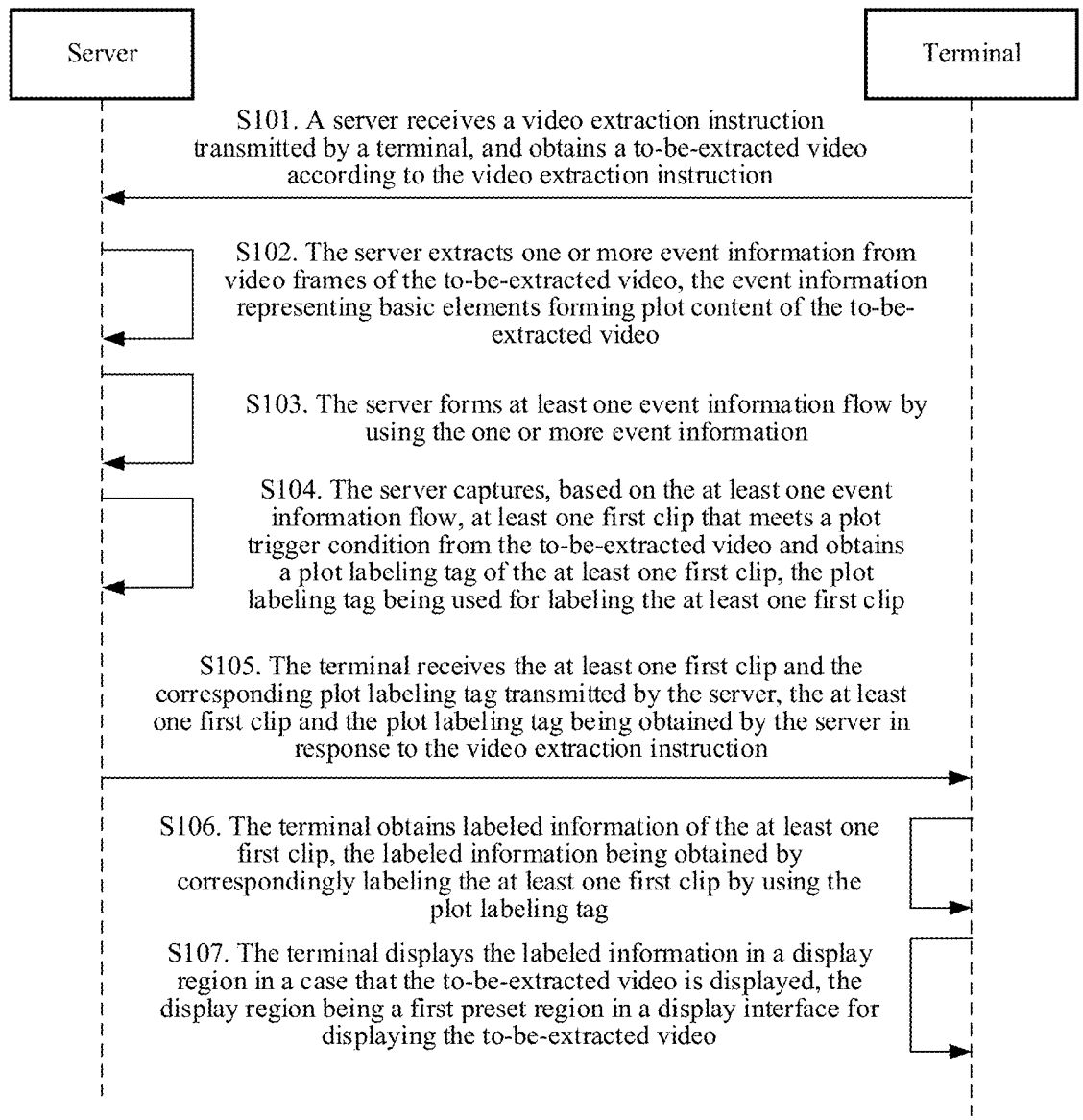
FIG. 4 is an exemplary schematic flowchart of a video labeling method according to an embodiment of this application.

FIG. 4 is an exemplary schematic flowchart of a video labeling method according to an embodiment of this application. The method is described with reference to steps shown in FIG. 4. The video labeling method provided in this embodiment of this application includes the following steps.

S101. A server receives a video extraction instruction transmitted by a terminal, and obtains a to-be-extracted video according to the video extraction instruction.

In this embodiment of this application, the method is implemented in a scenario of performing video clip labeling on a video. A terminal generates a video extraction instruction according to an operation of a user, and transmits the video extraction instruction to a server, the video extraction instruction specifying a to-be-extracted video on which video labeling is performed. That is, the terminal specifies, by using the video extraction instruction, the to-be-extracted video that needs to be labeled, and then transmits the video extraction instruction to the server, to inform the server of which video needs to be labeled. The server receives the video extraction instruction transmitted by the terminal, and obtains, according to the video extraction instruction, the to-be-extracted video specified by the user.

The terminal may carry the to-be-extracted video in the video extraction instruction, so that the server may synchronously receive the to-be-extracted video when receiving the video extraction instruction, to obtain the to-be-extracted video according to the video extraction instruction; or the video extraction instruction may carry identifier information of the to-be-extracted video, so that the server may obtain, in response to the video extraction instruction, the to-be-extracted video from a network according to the identifier information of the to-be-extracted video. This is not limited in this application.

It may be understood that the identifier information of the to-be-extracted video refers to an identifier that can distinguish the to-be-extracted video from another video. In this embodiment of this application, a video number may be selected as the identifier information of the to-be-extracted video, or a video title may be selected as the identifier information of the to-be-extracted video, or another information may be selected as the identifier information of the to-be-extracted video. This is not limited in this embodiment of this application.

In this embodiment of this application, the to-be-extracted video may be a video that is recorded by a user in real time, for example, a game video that is recorded in real time in a game live streaming platform. In this way, an effect of extracting a wonderful clip while performing a live broadcast can be achieved through cooperative operation between the terminal and the server. The to-be-extracted video may be alternatively a video that has been stored in the terminal, for example, a game video that has been downloaded by a user. In this way, an effect of extracting a wonderful clip of the existing video can be achieved through cooperative operation between the terminal and the server. The to-be-extracted video may be alternatively a video of another type, for example, a video stored in a cloud. This is not limited in this embodiment of this application.

It may be understood that the to-be-extracted video may be a video of any type, for example, a movie video, a TV play video, an animation video, a game video, or a variety video. This is not limited in this embodiment of this application.

S102. The server extracts event information from video frames of the to-be-extracted video, the event information representing basic elements forming plot content of the to-be-extracted video.

After obtaining the to-be-extracted video, the server may disassemble the to-be-extracted video into a series of video frames, and then extract event information from the video frames of the to-be-extracted video, to obtain event information included in the video frames, that is, extract, from the video frames, basic elements that can form plot content of the to-be-extracted video.

It may be understood that there may be more than one basic element that can form plot content and that is included in some video frames, that is, the server can extract a plurality of pieces of event information from some video frames, and each video frame inevitably includes a basic element forming the plot content. Therefore, the server can extract event information from each video frame.

Because the plot content may be generally disassembled into basic elements such as a time, a location, a character, a behavior, a consequence, and a plot condition, correspondingly, the event information may be information representing the character, for example, a game character occurring in a game video or a role occurring in a movie video; or the event information may be information representing the location, for example, a coordinate location in a game video or an indoor scene in a TV play video; or the event information may be information representing the behavior, for example, a behavior of a game character in a game video or a behavior of a character in a variety video; or the event information may be information representing the plot condition, for example, a life value of a game character in a game video, or a line of a leading role in a movie video; or the event information may be information representing the consequence, for example, a game character in a game video defeats a monster in a game or a game character win in a game video. Because the video frames have a sequence, the event information extracted by the server from different video frames also has a sequence.

S103. The server forms at least one event information flow by using the event information.

The server integrates the extracted event information according to a sequence of the video frames, and uses a result of the integration as an event information flow. In other words, a sequence of event information in the event information flow is certainly the same as the sequence of the video frames. Event information in some video frames may form one event information flow, and event information in some other video frames form another event information flow. Therefore, the server may obtain at least one event information flow.

Although the plot content may be disassembled into the basic elements such as the time, the location, the character, the behavior, the consequence, and the plot condition, the basic elements are combined in sequence, that is, only the time, the location, the character, the behavior, the consequence, and the plot condition are combined according to a particular sequence, plot content that can be understood by the user may be obtained. Therefore, the server needs to first integrate the event information according to the sequence of the video frames, and describes the plot content in the video in a form of the event information flow. In this way, a first clip can be captured with reference to a plot trigger condition subsequently.

S104. The server captures, based on the at least one event information flow, at least one first clip that meets a plot trigger condition from the to-be-extracted video and obtains a plot labeling tag of the at least one first clip, the plot labeling tag being used for labeling the at least one first clip.

After obtaining the event information flows that can representing the plot content, the server analyzes the event information flows with reference to a plot trigger condition, determines whether events meet a condition of becoming a first clip, that is, whether the events meet a preset plot trigger condition, then extracts an event information flow that meets the plot trigger condition, determines a start video frame and an end video frame that correspond to the event information flow, determines a start time of the first clip according to a playing moment corresponding to the start video frame, and determines an end time of the first clip according to a playing moment corresponding to the end video frame. In this way, the server can capture a segment of video from the to-be-extracted video according to the start time and the end time, and use the segment of video as the first clip. Meanwhile, the server obtains a plot labeling tag of the at least one first clip according to the plot trigger condition.

In this embodiment of this application, the first clip may be a wonderful clip in a video, or may be another clip in a video, for example, a clip that an audience prefers to watch or a social positive energy promotional clip. This is not limited in this embodiment of this application.

It may be understood that because there may be more than one plot content that meets the condition of becoming the first clip in plot content included in the to-be-extracted video, the server can capture at least one first clip from the to-be-extracted video.

In this embodiment of this application, the plot trigger condition represents a condition measuring that the plot content can become the first clip, that is, the plot content can be used as the first clip provided that the plot content meets the plot trigger condition. In this embodiment of this application, the plot trigger condition is obtained by analyzing a plot and performing configuration according to a result of the analysis.

In this embodiment of this application, the plot labeling tag is a tag that can generally describe the plot content in the first clip. The plot labeling tag corresponds to the plot trigger condition, that is, when an event information flow meets which plot trigger condition, a captured first clip has a plot labeling tag corresponding to the plot trigger condition. For example, when the event information flow meets a plot trigger condition corresponding to a counter attack plot, a plot labeling tag of a first clip is counter attack; and when the event information flow meets a plot trigger condition corresponding to a plot of defeating a tyrant, a plot labeling tag of a first clip is defeating a tyrant.

S105. The terminal receives the at least one first clip and the corresponding plot labeling tag transmitted by the server, the at least one first clip and the plot labeling tag being obtained by the server in response to the video extraction instruction.

In this embodiment of this application, after the server captures, based on the at least one event information flow, the at least one first clip that meets the plot trigger condition from the to-be-extracted video and obtains the plot labeling tag of the at least one first clip, the server may transmit the at least one first clip and the corresponding plot labeling tag to the terminal through a network, so that the terminal labels the corresponding at least one first clip by using the plot labeling tag, and displays obtained labeled information and the corresponding at least one first clip, to complete video labeling of the to-be-extracted video. The terminal receives the at least one first clip and the corresponding plot labeling tag transmitted by the server. All operations in which the server captures the first clip and obtains the plot labeling tag are response operations after receiving the video extraction instruction transmitted by the terminal. Therefore, the first clip and the plot labeling tag may be understood as being obtained by the server in response to the video extraction instruction.

S106. The terminal obtains labeled information of the at least one first clip, the labeled information being obtained by correspondingly labeling the at least one first clip by using the plot labeling tag.

The terminal obtains labeled information of each first clip in the at least one first clip for displaying the labeled information subsequently. Because the plot labeling tag and the first clip are simultaneously generated, there is a correspondence between the plot labeling tag and the first clip. Before obtaining the labeled information of the at least on first clip, the terminal may label the at least one first clip by using the plot labeling tag by using the correspondence, to obtain the labeled information.

The labeled information of the at least one first clip obtained by the terminal may be alternatively obtained by correspondingly labeling, by the server, the at least one first clip by using the plot labeling tag. In this case, step S105 becomes that the terminal receives the at least one first clip and the labeled information transmitted by the server, or receives the at least one first clip, the plot labeling tag, and the labeled information transmitted by the server. This is not limited in this embodiment of this application.

S107. The terminal displays the labeled information in a display region when the to-be-extracted video is displayed, the display region being a first preset region in a display interface for displaying the to-be-extracted video.

The terminal displays the labeled information in a preplanned display region in a display interface, so that the user may learn which first clips are in the to-be-extracted video by using the labeled information, and the user performs an operation on the first clips subsequently. In this way, a video labeling process of the to-be-extracted video is completed.

The labeled information display region is the first preset region located in the display interface. The first preset region may be set in a right side of the display interface, or may be set in a left side of the display interface, or may be set in another position of the display interface. This is not limited in this embodiment of this application.

In some embodiments of this application, in addition to displaying the labeled information, the terminal may display a start time and an end time of the first clip, so that the user learns that the labeled information corresponds to a video of which time period; or may display the to-be-extracted video in another display region that does not overlap the first preset region, so that the user can play the to-be-extracted video while learning which video clip in the to-be-extracted video is the first clip. In addition, the terminal may alternatively set a display region used for playing the first clip in the another display region. In this way, the user not only can learn which clip is the first clip but also directly view the first clip in the display region.

The labeled information refers to a set of labeling the at least one first clip respectively, the labeled information includes at least one sub-labeled information, and each sub-labeled information corresponds to one first clip, that is, the first clip is in one-to-one correspondence to the sub-labeled information. When displaying the labeled information on the display interface of the terminal, the terminal actually displays the sub-labeled information included in the labeled information.

It may be understood that the terminal may add a playing link of a first clip to sub-labeled information corresponding to each first clip, so that the user may start playing the first clip after clicking the playing link; or the terminal may generate a playing identifier for sub-labeled information corresponding to each first clip, so that the user starts playing the first clip after clicking the playing identifier.

Figure 5:
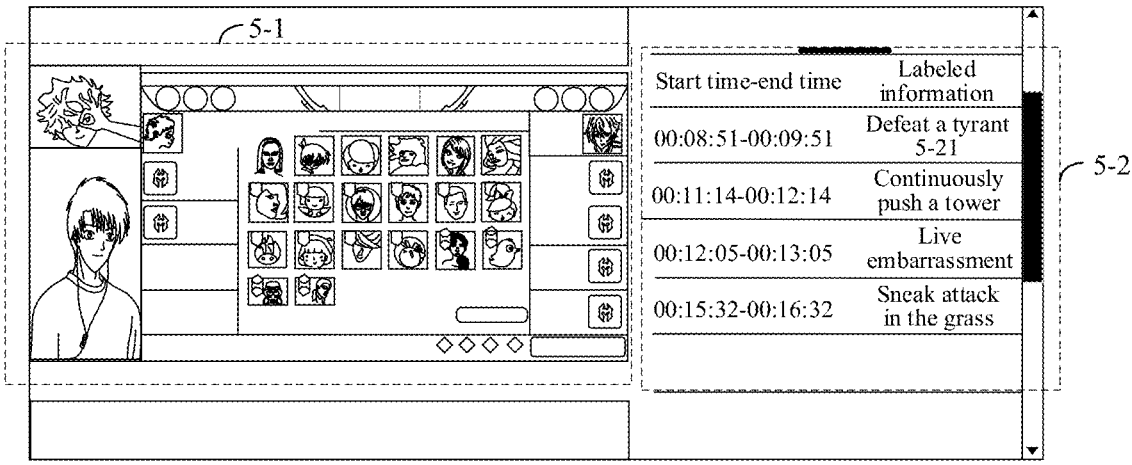
FIG. 5 is an exemplary diagram of labeled information according to an embodiment of this application.

For example, FIG. 5 is an exemplary diagram of labeled information according to an embodiment of this application. In FIG. 5, a display region 5-1 is a display region for playing a to-be-extracted video, and a display region 5-2 is a display region for displaying labeled information. When the to-be-extracted video is a competitive game video recorded by a user on a live streaming platform, the terminal can play the competitive game video in the display region 5-1, and start times and end times of four first clips captured from the competitive game video and sub-labeled information corresponding to the four first clips are respectively displayed in the display region 5-2, that is, 00:08:51-00:09:51 defeating a tyrant 5-21, 00:11:14-00:12:14 continuously pushing a tower 5-22, 00:12:05-00:13:05 living embarrassment 5-23, and 00:15:32-00:16:32 sneak attack in the grass 5-24. In this way, the user can learn which first clips have relatively high viewing value in the competitive game video from the display interface of the terminal.

In the embodiments of this application, a server can receive a video extraction instruction transmitted by a terminal, then obtain a to-be-extracted video according to the video extraction instruction, subsequently extract event information from video frames of the to-be-extracted video, subsequently form at least one event information flow by using the obtained event information, and finally capture, based on the at least one event information flow, at least one first clip that meets a plot trigger condition from the to-be-extracted video and obtain a plot labeling tag of the at least one first clip; and the terminal receives the at least one first clip and the plot labeling tag transmitted by the server, subsequently obtains labeled information obtained by correspondingly labeling the at least one first clip by using the plot labeling tag, and further displays the labeled information in a display region, to complete a video labeling process of the to-be-extracted video. Therefore, wonderful clips that meet a condition can be recognized from the to-be-extracted video by using image content in the video frames of the to-be-extracted video, and the wonderful clips are captured and labeled, to improve video labeling efficiency.

In some embodiments of this application, the capturing, by the server based on the at least one event information flow, at least one first clip that meets a plot trigger condition from the to-be-extracted video and obtaining a plot labeling tag of the at least one first clip, that is, an implementation process of S104, may include S1041 and S1042 as follows.

S1041. The server extracts, from the at least one event information flow, an event information flow that meets the plot trigger condition as at least one target event information flow, the plot trigger condition being a condition representing wonderful plot content. In some embodiments, the wonderful plot content represents the content of a wonderful clip in a video that has been watched and/or commented more frequently than other portions of the video by at least a certain number of times.

After obtaining the at least one event information flow, the server may obtain a preset plot trigger condition from a storage space of the server, and determine the obtained at least one event information flow by using the obtain plot trigger condition. When an event information flow in the at least one event information flow meets the plot trigger condition, the server considers that plot content described by the event information flow has relatively high viewing value, that is, a series of video frames corresponding to the event information flow can present plot content that the user prefers to watch after being played in sequence. Therefore, the server uses the event information flow as a target event information flow. Because there may be more than one event information flow that meets the plot trigger condition in the extracted at least one event information flow, the server may obtain at least one target event information flow.

For example, when wonderful plot content in a variety show is an argument plot, the server may analyze the argument plot, to learn that the argument plot is that two teams of debaters take turns to speak over a period of time. Therefore, the server may set a plot trigger condition to that two teams of debaters take turns to speak in a variety video, plot content of a video clip in the variety video is wonderful plot content only when meeting the requirement, and plot content of a video clip is not wonderful plot content when does not meet the requirement, for example, interaction between a host and an audience is not the wonderful plot content.

Figure 6:
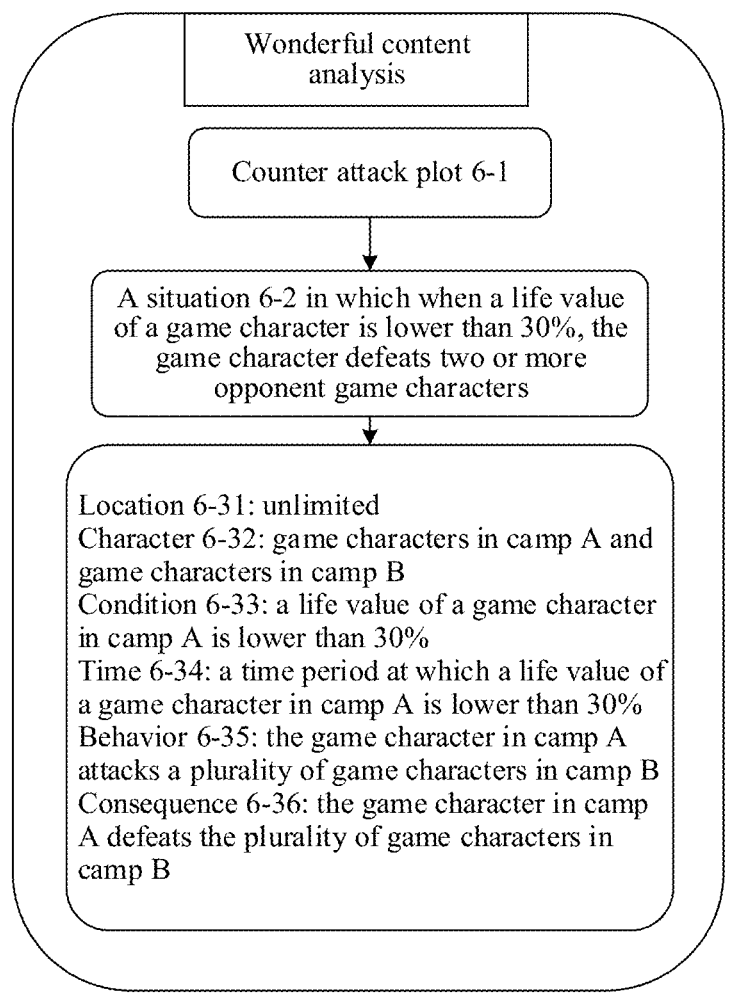
FIG. 6 is an exemplary diagram of a process of analyzing a wonderful plot in a game video according to an embodiment of this application.

For example, FIG. 6 is an exemplary diagram of a process of analyzing a wonderful plot in a game video according to an embodiment of this application. As shown in FIG. 6, when wonderful plot content in a game video is a counter attack plot 6-1, the counter attack plot 6-1 may be analyzed, to learn that the counter attack plot 6-1 refers to a situation 6-2 in which a game character defeats two or more enemy game characters when a life value is lower than 30%. Further, the server may further refine the counter attack plot 6-1, to learn that a location 6-31 of counter attack is not limited, characters 6-32 of counter attack are game characters in camp A and game characters in camp B (the camp A and the camp B are hostile to each other), a condition 6-33 of the counter attack is that a life value of a game character in the camp A is lower than 30%, a time 6-34 of the counter attack is a time period at which the life value of the game character in the camp A is lower than 30%, a behavior 6-35 of the counter attack is that the game character in the camp A attacks a plurality of game characters in the camp B, and a consequence 6-36 of the counter attack is the game character in the camp A defeats the plurality of game characters in the camp B. In this case, the server may set a plot trigger condition according to the analysis results.

It may be understood that in this embodiment of this application, the plot trigger condition does not specifically refer to a plot condition but generally refers to all preset plot trigger conditions. That is, there may be a plurality of different plot trigger conditions in the server, and the server can extract target event information flows corresponding to a plurality of different plot content according to the plot trigger conditions.

S1042. The server captures, according to each target event information flow in the at least one target event information flow, the at least one first clip from the to-be-extracted video, and obtains the plot labeling tag of the at least one first clip according to the plot trigger condition.

After obtaining through analysis a start video frame and an end video frame that correspond to each target event information flow, the server further captures a first clip corresponding to each target event information flow from the to-be-extracted video according to a playing moment corresponding to the start video frame and a playing moment corresponding to the end video frame of each target event information flow, until first clips corresponding to all target event information flows in the at least one target event information flow are captured, and the server may obtain at least one first clip. In addition, the target event information flow is extracted according to the plot trigger condition, and the target event information flow has a corresponding first clip. Therefore, there is a correspondence between the first clip and the plot trigger condition. Therefore, the server may further determine a plot labeling tag corresponding to each first clip according to a plot trigger condition corresponding to each target event information flow, to determine the plot labeling tag corresponding to the at least one first clip.

In some embodiments of this application, the server may briefly summarize the plot trigger condition, and use content obtained through summarization as the plot labeling tag of the first clip. Certainly, the server may alternatively generate the plot labeling tag of the first clip in another manner. For example, the most important plot condition in the plot trigger conditions is used as the plot labeling tag. This is not limited in this embodiment of this application.

In this embodiment of this application, the server can compare at least one event information flow with a set plot trigger condition, extract at least one target event information flow from the at least one event information flow, and finally capture at least one first clip according to time information corresponding to the target event information flow and obtain a plot labeling tag according to the plot trigger condition. In this way, the server can capture, based on at least one event information flow obtained from image content of video frames of the to-be-extracted video, a first clip that meets the plot trigger condition and obtain a plot labeling tag, to complete video labeling.

In some embodiments of this application, the capturing, by the server according to each target event information flow in the at least one target event information flow, the at least one first clip from the to-be-extracted video, and obtaining the plot labeling tag of the at least one first clip according to the plot trigger condition, that is, an implementation process of S1042, may include S1042*a* to S1042*d* as follows.

S1042*a*. The server determines a start video frame and an end video frame for each target event information flow, the start video frame being corresponding to a video frame in which a target event information flow starts, and the end video frame being corresponding to a video frame in which the target event information flow ends.

Because event information is extracted from the video frames of the to-be-extracted video, there may be a correspondence between the event information and the video frames of the to-be-extracted video inevitably. The server can determine, from the video frames of the to-be-extracted video, a video frame when each target event information flow starts, that is, determine a start video frame according to the correspondence and event information when a target event information flow starts, and determine a video frame when each target event information flow ends, that is, determine, from the video frames of the to-be-extracted video, an end video frame according to the correspondence and event information when the target event information flow ends. The server performs the operation on each target event information flow, and can determine a start video frame and an end video frame for each target event information flow respectively.

S1042*b*. The server uses a playing moment corresponding to the start video frame as a first clip start time point, and uses a playing moment corresponding to the end video frame as a first clip end time point.

Each video frame has a corresponding playing moment, and both the start video frame and the end video frame are determined from the video frames of the to-be-extracted video. Therefore, the start video frame and the end video frame have corresponding playing moments respectively. In this case, the server may directly use the playing moment corresponding to the start video frame as a start time point of the first clip and use the playing moment corresponding to the end video frame as an end time point of the first clip. In this way, the server can learn that video content within which time period of the to-be-extracted video belongs to the first clip.

For example, when a start video frame of a target event information flow is a tenth frame and an end video frame of which event information flow ends of the target event information flow is a $30^{th}$ frame, the server may use a playing moment corresponding to the tenth frame as a start time point of a first clip and use a playing moment corresponding to the $30^{th}$ frame as an end time point of the first clip. In this way, the server can learn a time period corresponding to the first clip.

S1042*c*. The server captures the at least one first clip from the to-be-extracted video according to the first clip start time point and the first clip end time point.

After learning the first clip start time point and the first clip end time point, the server may capture video content between the first clip start time point and the first clip end time point as the first clip. In this manner, the server may obtain a first clip corresponding to each target event information flow, to obtain the at least one first clip.

S1042*d*. The server uses a plot tag corresponding to the plot trigger condition as the plot labeling tag.

The server directly uses a plot tag corresponding to the plot trigger condition as the plot labeling tag. It may be understood that the plot tag is named according to a characteristic of a plot during plot analysis. Certainly, the plot tag may be alternatively determined in another manner. For example, the plot tag is determined according to a star included in the plot trigger condition. This is not limited in this embodiment of this application.

In this embodiment of this application, the server determines a start video frame and an end video frame for each target event information flow and further determines a first clip start time point and a first clip end time point, extracts video content between the first clip start time point and the first clip end time point, to obtain at least one first clip, and then uses a plot tag corresponding to a plot trigger condition as a plot labeling tag. In this manner, the server can complete a labeling process of the at least one first clip.

In some embodiments of this application, after the receiving, by a server, a video extraction instruction transmitted by a terminal, and obtaining a to-be-extracted video according to the video extraction instruction, and before the extracting, by the server, event information from video frames of the to-be-extracted video, that is, after S101, and before S102, the method may further include: S108 to S110 as follows.

S108. The server extracts at least one initial video frame from the to-be-extracted video.

After obtaining the to-be-extracted video, the server may further perform preprocessing such as frame extraction, cropping, and recognition on the video frames of the to-be-extracted video in addition to obtaining the event information from the video frames of the to-be-extracted video, to obtain at least one to-be-processed video frame. Through preprocessing, on one hand, a quantity of video frames that need to be processed subsequently during extraction of event information may be reduced subsequently, and a processing speed is accelerated, and on the other hand, content that easily affects extraction of the event information in the to-be-extracted video may be removed, for example, advertisement content in a video is removed, so that the event information is extracted more accurately.

When preprocessing the video frames of the to-be-extracted video, the server first extracts at least one initial video frame from the to-be-extracted video according to a particular frame extraction interval, to facilitate subsequent preprocessing of the initial video frames.

Frame extraction is to reduce a quantity of video frames that need to be preprocessed subsequently and improve a preprocessing speed, thereby improving the video labeling efficiency.

It may be understood that in this embodiment of this application, the frame extraction interval may be set, for example, one frame is extracted every 10 frames, or may be calculated by the server according to a frame rate of the to-be-extracted video. In some embodiments, the frame extraction interval may be set according to an actual situation. This is not limited in this embodiment of this application.

S109. The server crops each initial video frame in the at least one initial video frame, to obtain at least one intermediate video frame.

After obtaining the at least one initial video frame, the server may crop each initial video frame, divide the initial video frame into a video playing part and a non-video playing part, filter out the non-video playing part, and use the video playing part as an intermediate video frame. In this way, after the server crops each initial video frame to obtain an intermediate video frame corresponding to each initial video frame, the server can obtain at least one intermediate video frame.

The non-video playing part refers to an image part around the video playing region, for example, an advertisement page on the side of the video playing region or a brief content introduction page on the side of the video playing region. The video playing parts are filtered out, so that subsequent frame recognition and even event information extraction can be concentrated on the video playing part, impact of redundant content in the video frames on subsequent processing is reduced, and accuracy of extraction of event information is improved, thereby improving video labeling accuracy. The video playing part refers to a video playing region, that is, an image region in which video content is played actually.

S110. The server recognizes at least one to-be-processed video frame from the at least one intermediate video frame.

After obtaining the at least one intermediate video frame, the server performs image recognition on each intermediate video frame in the at least one intermediate video frame, to recognize an intermediate video frame that needs to be processed and an intermediate video frame that does not need to be processed from the at least one intermediate video frame, and then use the recognized intermediate video frame that needs to be processed as a to-be-processed video frame. Because there may be more than one recognized intermediate video frame that needs to be processed, after recognizing each intermediate video frame, the server may obtain at least one to-be-processed video frame. After the server obtains the at least one to-be-processed video frame, a process in which the server extracts the event information from the video frames of the to-be-extracted video is correspondingly changed into a process in which the server extracts the event information from each to-be-processed video frame of the at least one to-be-processed video frame.

It may be understood that there may be some content such as an advertisement that is irrelevant to a video in the video, so that there may be intermediate video frames that are irrelevant to video content in the at least one intermediate video frame, the intermediate video frames do not need to be processed, and the video frames cannot be removed through cropping. In this case, the server needs to recognize and delete the intermediate video frames that are irrelevant to the video content from the at least one intermediate video frame in an image recognition manner, and uses remaining intermediate video frames that need to be processed as to-be-processed video frames, thereby achieving higher accuracy of subsequent extraction of event information.

In this embodiment of this application, the server can first extract at least one initial video frame from a to-be-extracted video, then crop each initial video frame, to obtain at least one intermediate video frame, and finally select at least one to-be-processed video frame from the at least one intermediate video frame in an image recognition manner. Therefore, video frames that need to be processed during extraction of event information can be reduced, and video labeling efficiency is improved. In addition, impact of content that is irrelevant to video content on extraction of event information can be reduced, and the video labeling efficiency is improved.

In some embodiments of this application, the extracting, by the server, event information from video frames of the to-be-extracted video, that is, an implementation process of S102 may include S1021 to S1024 as follows.

S1021. The server matches one or more first event information from the video frames by using a preset matching template, the first event information representing event information obtained through template matching.

The server performs a template matching operation on the video frames of the to-be-extracted video by using a preset image template, that is, by using a preset matching template, and uses event information matched from the video frames of the to-be-extracted video in a template matching manner as first event information.

It may be understood that the preset matching template may be a health bar icon in a competitive game, or may be an item image with a specific shape occurring in a movie video, or may be a template of another type. This is not limited in this embodiment of this application.

In this embodiment of this application, the server may directly obtain the first event information from the video frames by using the preset matching template, or may match intermediate information from the video frames by using the preset matching template, and then process the intermediate information, to obtain the first event information. A manner of obtaining the first event information by using the preset matching template may be selected according to an actual requirement. This is not limited in this embodiment of this application.

Figure 7:
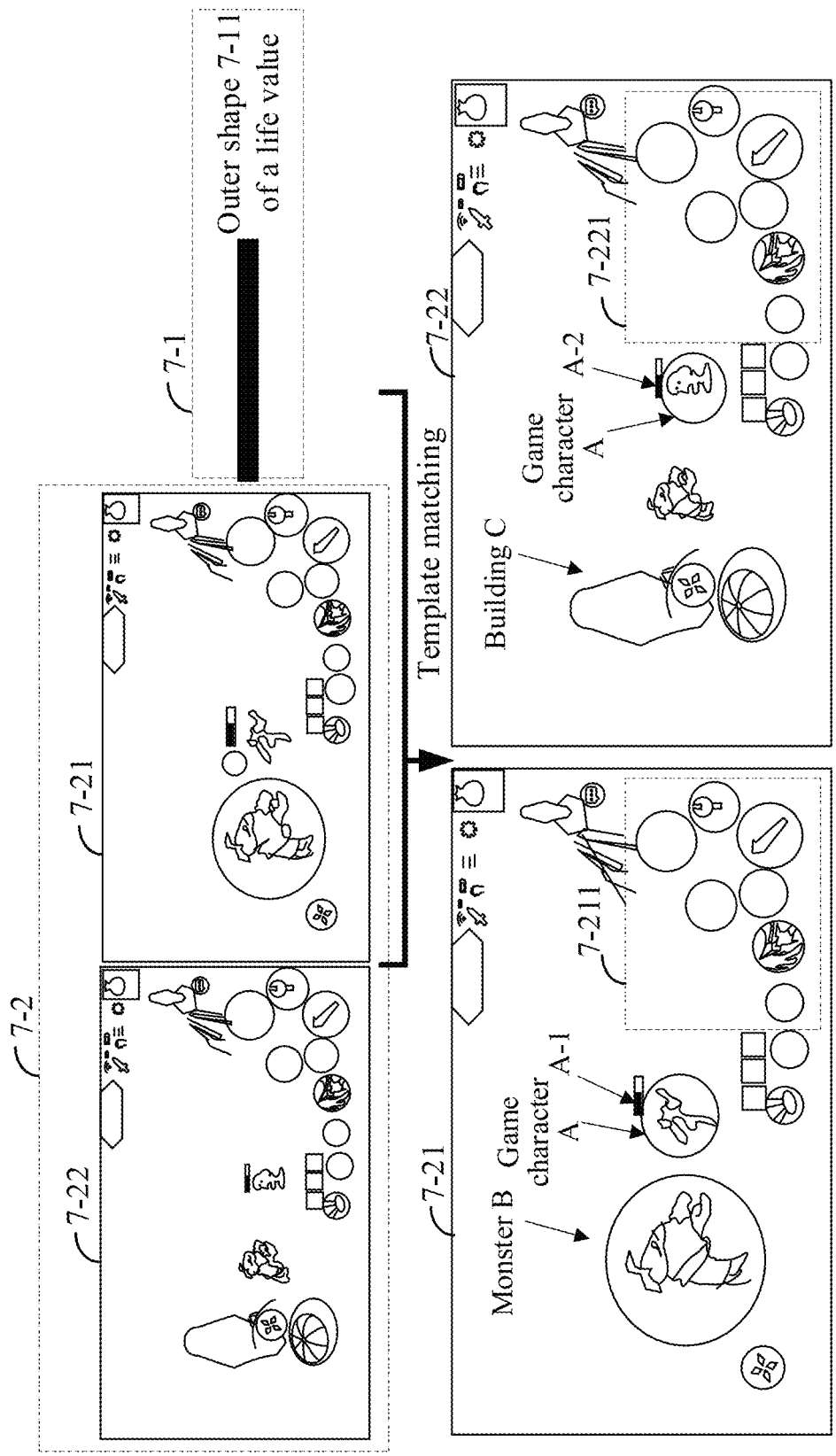
FIG. 7 is an exemplary diagram of matching first event information according to an embodiment of this application.

For example, FIG. 7 is an exemplary diagram of matching first event information according to an embodiment of this application. As shown in FIG. 7, when first event information is a life value of a game character A in a game video, template matching is respectively performed on a video frame 7-21 and a video frame 7-22 in a display region 7-2 by using an outer shape 7-11 of a life value set in a display region 7-1. In the video frame 7-21, the game character A is causing harm to a monster B in a map by using a skill in a display region 7-211, and meanwhile, the monster B also causes harm to the game character A. The server may match an outer shape A-1 of a life value of the game character A from the video frame 7-21 by using the outer-shape 7-11 of the life value, and then calculate a life value of the game character A in the video frame 7-21 by using a ratio of a dark region in A-1 to A-1. In the video frame 7-22, the game character A is causing harm to a building C in the map by using a skill in a display region 7-221. The server may match an outer shape A-2 of the life value of the game character A from the video frame 7-22 by using the outer shape 7-11 of the life value, and then calculate a life value of the game character A in the video frame 7-22 by using a ratio of a dark region in A-2 to A-2.

S1022. The server performs feature extraction on the video frames, to obtain video image feature points, matches the video image feature points with feature points extracted from preset images, to obtain one or more second event information, the second event information representing event information obtained through feature point matching, and the video image feature points representing points for describing image features in the video frames.

The server may first extract feature points from preset images, then perform feature extraction on the video frames, to obtain video image feature points, and subsequently match the video image feature points of the video frames with the feature points extracted from the preset images. When there are some video image feature points matching the feature points extracted from the preset images, the server captures image content corresponding to the video image feature points, and analyzes this part of image content, to obtain second event information, for example, a coordinate system is established for the image content, to obtain coordinates of a character in a video, the coordinates are used as the second event information; or the server extracts information corresponding to the preset images from a database as second event information, for example, names of game characters corresponding to the preset images are used as the second event information.

It may be understood that the server may perform feature extraction on the preset image and the video frame respectively by using a fast feature point extraction and description (oriented FAST and rotated BRIEF, ORB) algorithm, or may perform feature extraction on the preset image and the video frame respectively by using a principal component analysis (PCA) algorithm. Certainly, feature extraction may be alternatively performed on the preset image and the video frame respectively by using another feature extraction algorithm, as long as it can be ensured that the same feature extraction algorithm is used for the preset image and the video frame. This is not limited in this embodiment of this application.

Figure 8:
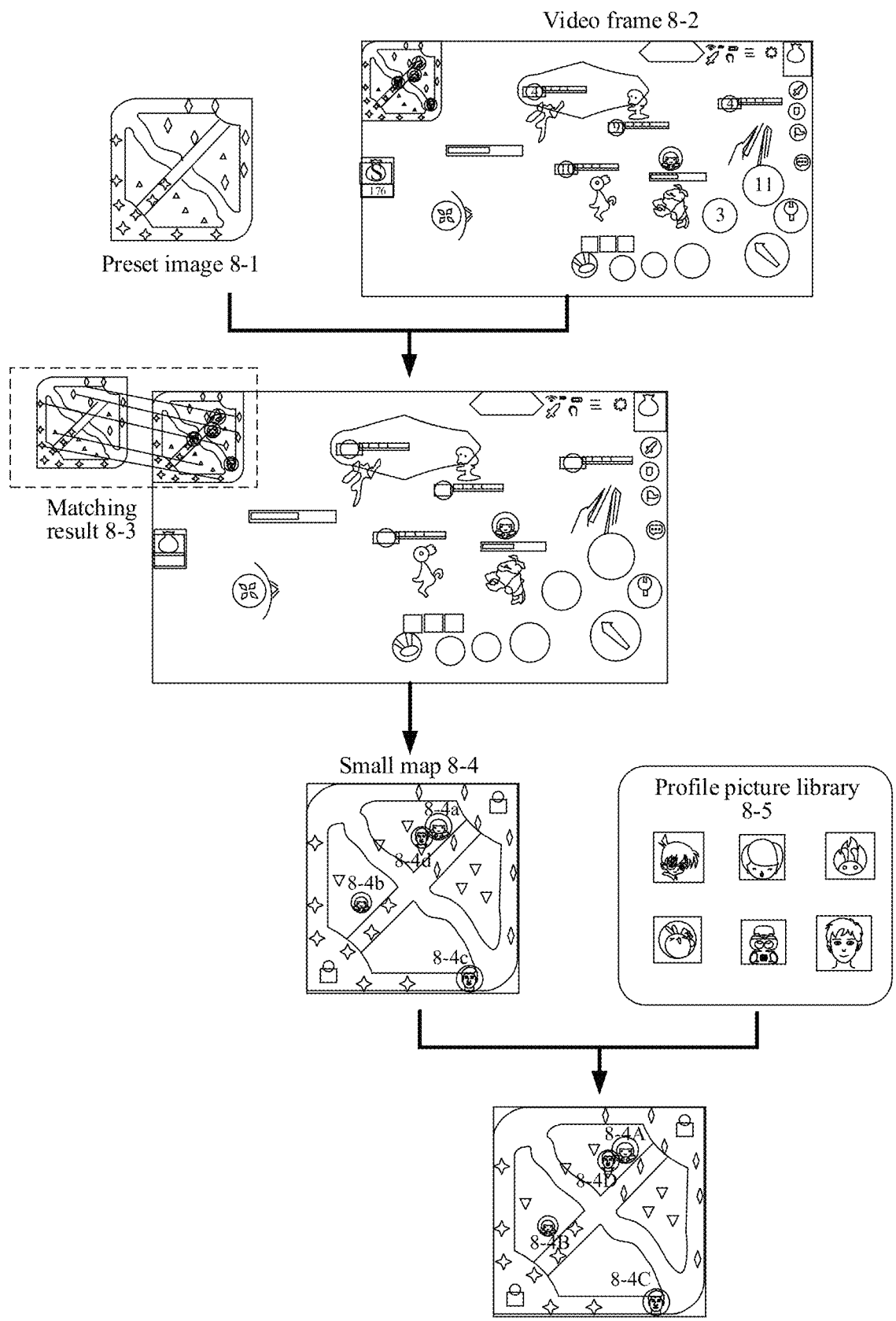
FIG. 8 is an exemplary diagram of extracting second event information according to an embodiment of this application.

For example, FIG. 8 is an exemplary diagram of extracting second event information according to an embodiment of this application. In FIG. 8, the second event information refers to coordinates of different game characters in a small map in a game video and a preset image 8-1 is an image of the small map. The server performs ORB feature extraction on the preset image 8-1 and performs ORB feature extraction on a video frame 8-2, and then matches an ORB feature of the preset image 8-1 with an ORB feature of the video frame 8-2, to obtain a matching result 8-3, connected feature points representing matched feature points. In this way, the server may capture a small map 8-4 from the video frame 8-2. Subsequently, the server establishes a coordinate system for the small map 8-4, to learn that coordinates of a profile picture of each game character in the small map 8-4, that is, to learn coordinates of a profile picture 8-4a, coordinates of a profile picture 8-4b, coordinates of a profile picture 8-4c, coordinates of a profile picture 8-4d respectively. Subsequently, the server needs to further match the profile pictures of the game characters with the game characters and then can obtain the second event information. In this case, the server extracts ORB features of profile pictures of game characters in a profile picture library 8-5 of the game characters and extracts ORB features of a profile picture of each game character in the small map 8-4, and matches the ORB features of the profile pictures of the game characters in the profile picture library 8-5 of the game characters with the ORB features of the profile picture of each game character in the small map 8-4. In this way, the server can learn that the profile picture of each game character in the small map 8-4 corresponds which game character, that is, learn that the profile picture 8-4a corresponds to the game character 8-4A, the profile picture 8-4b corresponds to the game character 8-4B, the profile picture 8-4c corresponds to the game character 8-4C, and the profile picture 8-4d corresponds to the game character 8-4D, and further learn coordinates of the game character 8-4A, the game character 8-4B, the game character 8-4C, and the game character 8-4D in the small map 8-4 according to the coordinates of the profile picture of each game in the small map 8-4. In this way, the server obtains the second event information.

S1023. The server extracts one or more third event information from the video frames by using a preset event detection model, the third event information representing event information obtained through model extraction.

The server can further directly process the video frames by using a trained preset event detection model, that is, the server uses the video frames of the to-be-extracted video as inputs respectively, inputs the video frames into the preset event detection model for classification, and uses a result of the classification as third event information.

In this embodiment of this application, the server may directly input the video frames into the preset event detection model for classification, or may perform scaling processing on the video frames and input a result of the scaling into the preset event detection model for classification, or may capture some images from the video frames and input the captured images into the preset event detection model for classification. A manner of classifying the video frames may be selected according to an actual situation. This is not limited in this embodiment of this application.

It may be understood that in this embodiment of this application, the preset event detection model is a model configured to classify images, and the preset event detection model may be a deep learning model such as a convolutional neural network (CNN) model, or may be another classification model. This is not limited in this embodiment of this application.

Figure 9:
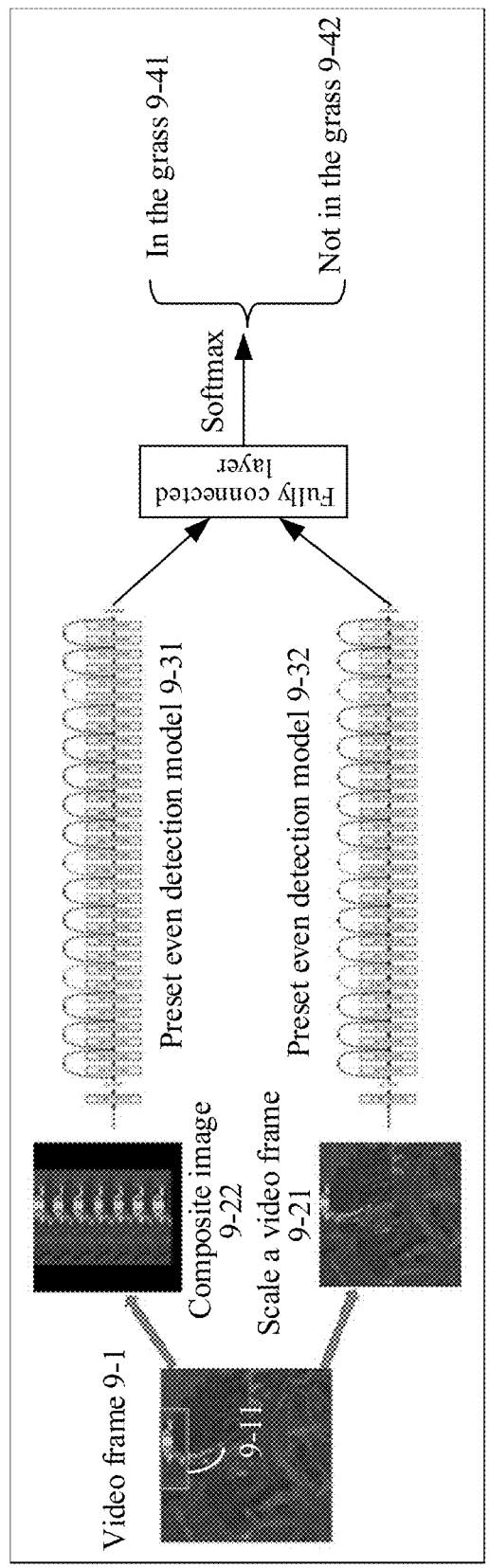
FIG. 9 is an exemplary diagram of extracting third event information according to an embodiment of this application.

For example, FIG. 9 is an exemplary diagram of extracting third event information according to an embodiment of this application. As shown in FIG. 9, the third event information may be whether a game character in a game video is in the grass. In this case, the preset event detection model is a model obtained through training by using two categories of images of the game character in the grass and the game character not in the grass. In this case, the server may perform scaling process on a video frame 9-1, to obtain a scaled video frame 9-21, and capture and copy an image part 9-11 in the video frame 9-1, to obtain a composite image 9-22. Subsequently, the server inputs the scaled video frame 9-21 and the composite image 9-22 into a preset event detection model 9-31 and a preset event detection model 9-32 respectively (the preset event detection model 9-31 and the preset event detection model 9-32 have the same structure but have different training data), integrates, by using a fully connected layer, a result outputted by the preset event detection model 9-31 and a result outputted by the preset event detection model 9-32, to obtain an integrated result, and finally analyzes the integrated result by using a softmax layer, to learn whether the game character is in the grass 9-41 or not in the grass 9-42. In this way, the server completes a process of extracting the third event information.

S1024. The server integrates the one or more first event information, the one or more second event information, and the one or more third event information, to obtain the event information.

After obtaining the one or more first event information, the one or more second event information, and the one or more third event information, the server may integrate the one or more first event information, the one or more second event information, and the one or more third event information. In this way, the server can obtain the event information.

In this embodiment of this application, the server can obtain first event information through template matching, obtain second event information through feature point matching, and obtain third event information through model detection, that is, event information in a to-be-processed video frame is extracted in a plurality of different event information extraction manners, so that the event information in the to-be-processed video frame is not missed.

In some embodiments of this application, the extracting, by the server, at least one initial video frame from the to-be-extracted video, that is, an implementation process of S108, may include S1081 to S1084 as follows.

S1081. The server obtains a playing frame rate of the to-be-extracted video.

S1082. The server performs approximate processing on the playing frame rate, to obtain an approximate playing frame rate.

When extracting the at least one initial video frame from the to-be-extracted video, the server needs to first obtains a playing frame rate of the to-be-extracted video, the playing frame rate being a frame rate determined when the to-be-extracted video is generated. For some videos, playing frame rates may not be integers, but a frame extraction operation requires a frame rate of the video to be an integer. Therefore, the server may further perform approximate processing on the playing frame rate, to obtain an integer approximate playing frame rate, facilitating frame extraction.

In this embodiment of this application, the server may first proportionate the playing frame rate to an obtained frame rate approximate parameter, to obtain a ratio result, subsequently perform a rounding operation on the ratio result, to obtain an intermediate approximate result, and finally use two times of the intermediate approximate result as the approximate playing frame rate. The frame rate approximate parameter may be set according to an actual situation. For example, the frame rate approximate parameter may be set 2, or the frame rate approximate parameter may be set to 5. This is not limited in this embodiment of this application.

For example, this embodiment of this application provides a formula of calculating the approximate playing frame rate, as shown in formula (1):

$$fps_{round} = \text{round}\left(\frac{fps_{ture}}{\sigma}\right) \times 2 \qquad (1)$$

where $fps_{ture}$ is a playing frame rate, round ( ) represents a rounding operation, $\sigma$ is a frame rate approximate parameter, and $fps_{round}$ is a calculated approximate playing frame rate. After obtaining a value of the playing frame rate, the server may substitute the value into formula (1) to calculate the approximate playing frame rate.

It may be understood that in some other embodiments of this application, the approximate playing frame rate may be alternatively calculated in another manner. For example, the playing frame rate may be directly rounded, to obtain the approximate playing frame rate, provided that it is ensured that the approximate playing frame rate is an integer. This is not limited in this embodiment of this application.

S1083. The server proportionates the approximate playing frame rate to a preset frame extraction frequency, to obtain a frame extraction interval, the preset frame extraction frequency representing a quantity of video frames to be extracted per second.

The server first obtains a preset frame extraction frequency, then proportionates the calculated approximate playing frame rate to a quantity of video frames to be extracted per second, that is, the preset frame extraction frequency, and uses an obtained ratio as a frame extraction interval. In this way, the server obtains the frame extraction interval.

For example, this embodiment of this application provides a formula of calculating the frame extraction interval, as shown in formula (2):

$$\alpha = \frac{fps_{round}}{R} \qquad (2)$$

where $fps_{round}$ is the approximate playing frame rate, R is a preset frame extraction frequency, and $\alpha$ is a calculated frame extraction interval. After obtaining a value of the approximate playing frame rate, the server may substitute the value into formula (2), to calculate a value of the frame extraction interval.

It may be understood that the preset frame extraction frequency may be set according to an actual requirement. This is not limited in this embodiment of this application. For example, the preset frame extraction frequency may be set to 2, that is, two video frames are extracted per second, or the preset frame extraction frequency may be set to 10, that is, 10 video frames are extracted per second.

S1084. The server decomposes the to-be-extracted video into full video frames, and extracts the at least one initial video frame from the full video frames according to the frame extraction interval, the full video frames representing all video frames forming the to-be-extracted video.

The server decomposes the to-be-extracted video into a series of video frames, the series of video frames obtained through decomposition being full video frames, then extracts a video frame from the full video frames at the frame extraction interval calculated in the foregoing step, and uses the extracted video frame as an initial video frame. In this way, the server can obtain the at least one initial video frame. The full video frames refer to all video frames forming the to-be-extracted video.

In this embodiment of this application, the server needs to further determine a playing moment for each initial video frame. When the playing moment is determined, a quantity of full video frames and a playing frame rate of the to-be-extracted video need to be learned. In some embodiments, the playing moment is obtained by proportionating the quantity of full video frames to the playing frame rate of the to-be-extracted video.

For example, this embodiment of this application provides formula of calculating the playing moment, as shown in formula (3):

$$T = \frac{F}{fps_{ture}} \quad (3)$$

where F is a quantity of full video frames, $fps_{ture}$ is the playing frame rate, and T is a calculated playing moment. After learning the quantity of full video frames and a value of the playing frame rate, the server can calculate a playing moment of an initial video frame.

In addition, the quantity of full video frames may be unknown for the server, and needs to be calculated additionally by using the playing frame rate and a total duration of a video. Moreover, a number of an extracted initial video frame may be obtained through a frame extraction operation, that is, a number of a first initial video frame is recorded as 1, a number of a second initial video frame is recorded as 2, and so one. After a number of the last initial video frame is obtained, numbers of all the initial video frames are obtained. The server may deform the formula of calculating the playing moment, so that calculation can be performed by using the approximate playing frame rate, the preset frame extraction frequency, and the number of the initial video frame.

The server may rewrite 1 as a ratio of the approximate playing frame rate to the approximate playing frame rate. In this way, a process of calculating the playing moment may be changed into that the quantity of full video frames is proportionated to the approximate playing frame rate, to obtain a first ratio result, the approximate playing frame rate is proportionated to the playing frame rate, to obtain a second ratio result, and the first ratio result is multiplied by the second ratio result, so that an obtained product is the playing moment.

For example, this embodiment of this application provides another formula of calculating the playing moment, as shown in formula (4):

$$T = \frac{F}{fps_{round}} \times \frac{fps_{round}}{fps_{ture}} \quad (4)$$

where F is the quantity of full video frames, $fps_{ture}$ is the playing frame rate, $fps_{round}$ is the approximate playing frame rate, and T is the calculated playing moment.

A quantity of initial video frames is a product of an approximate playing moment corresponding to the approximate playing frame rate and the preset frame extraction frequency, and the approximate playing moment is obtained by proportionating the quantity of full video frames to the approximate playing frame rate. Therefore, the server may learn that a ratio of the quantity of full video frames to the approximate playing frame rate is the same as a ratio of the numbers of the initial video frames to the preset frame extraction frequency. In this case, the server may replace the ratio of the quantity of full video frames to the approximate playing frame rate in the another formula of calculating the playing moment in the process, that is, in formula (4) with the ratio of the numbers of initial video frames to the preset frame extraction frequency. In this case, the playing moment is a product of the ratio of a quantity of initial video frames to the preset frame extraction frequency and the ratio of the approximate playing frame rate to the playing frame rate. In this way, the server obtains a manner of calculating the playing moment corresponding to the initial video frame by using the approximate playing frame rate, the preset frame extraction frequency, and the numbers of the initial video frames.

For example, this embodiment of this application provides a relationship between the quantity of initial video frames and the preset frame extraction frequency, as shown in formula (5):

$$\frac{N}{R} = t \quad (5)$$

where t is an approximate playing moment, R is the preset frame extraction frequency, and N is a number of an initial video frame, that is, $N^{th}$ initial video frame.

This embodiment of this application provides a formula of calculating an approximate playing moment, as shown in formula (6):

$$t = \frac{F}{fps_{round}} \quad (6)$$

where F is the quantity of full video frames, $fps_{round}$ is the approximate playing frame rate, and t is the approximate playing moment. The server may obtain formula (7) by substituting formula (6) into formula (5):

$$\frac{N}{R} = \frac{F}{fps_{round}} \quad (7)$$

where F is the quantity of full video frames, $fps_{round}$ is the approximate playing frame rate, t is the approximate playing moment, R is the preset frame extraction frequency, and N is the number of the initial video frame.

The server may obtain a formula of calculating the playing moment by using the approximate playing frame rate, the preset frame extraction frequency, and the quantity of initial video frames by substituting formula (7) into formula (4), as shown in formula (8):

$$T = \frac{N}{R} \times \frac{fps_{round}}{fps_{true}} \qquad (8)$$

where $fps_{round}$ is the approximate playing frame rate, $fps_{ture}$ is the playing frame rate, R is the preset frame extraction frequency, N is the number of the initial video frame, and T is the calculated playing moment. After learning a value of the approximate playing frame rate, a value of the playing frame rate, a value of the preset frame extraction frequency, and the quantity of initial video frames, the server may substitute the values into formula (8), to calculate a playing moment corresponding to an $N^{th}$ initial video frame.

In this embodiment of this application, the server first obtains a playing frame rate of a to-be-extracted video, then approximates the playing frame rate, to ensure that all frame extraction operations are performed based on an integer approximate playing frame rate, subsequently proportionates the approximate playing frame rate to a preset frame extraction frequency, to obtain a frame extraction interval, and finally extracts at least one initial video frame from full video frames by using the frame extraction interval. Therefore, a quantity of video frames that need to be processed in a subsequent cropping operation, recognition operation, and even event information extraction operation can be reduced, and the video labeling efficiency is further improved.

In some embodiments of this application, the cropping, by the server, each initial video frame in the at least one initial video frame, to obtain at least one intermediate video frame, that is, an implementation process of S109, may include S1091 to S1093 as follows.

S1091. The server performs edge detection on each initial video frame in the at least one initial video frame, to obtain a video playing edge, the video playing edge representing an edge for separating a video playing region and a non-video playing region.

There is a playing window used for displaying video content in a playing page of a video, the playing window being a video playing region. In addition, there are some playing windows that are irrelevant to the video content in the playing page of the video, for example, a playing window for displaying a social account of a video provider and advertisement content. The playing windows may be considered as non-video playing regions that are irrelevant to a video playing process. Generally, there is an obvious boundary edge between different playing windows, and the boundary edge can separate a video playing region and a non-video playing region. Therefore, the server may first recognize a boundary edge of each playing window in each initial video frame through edge detection when cropping each initial video frame, and use the recognized boundary edge as a video playing edge of each initial video frame.

It may be understood that the server may detect the video playing edge by using a canny edge detection algorithm, or may detect the video playing edge by using a Hough line detection algorithm, or certainly may detect the video playing edge by using another edge detection algorithm that can achieve the same purpose. This is not limited in this embodiment of this application.

The video playing edge detected by the server may be a line edge or may be a curve edge. This is not limited in this embodiment of this application.

S1092. The server crops each initial video frame into a video playing part and a non-video playing part according to the video playing edge.

After detecting the video playing edge, the server may divide each initial video frame into a video playing region and a non-video playing region by using the video playing edge, capture image content in the video playing region as a video playing part, and capture image content in the non-video playing region as a non-video playing part.

S1093. The server integrates the video playing part corresponding to each initial video frame, to obtain the at least one intermediate video frame.

The server uses the video playing part corresponding to each initial video frame as an intermediate video frame, to obtain at least one intermediate video frame and meanwhile, deletes the non-video playing part corresponding to each initial video frame. Therefore, the server completes a process of cropping each initial video frame in the at least one initial video frame.

It may be understood that because the at least one intermediate video frame is obtained by cropping the at least one initial video frame, a quantity of intermediate video frames is equal to a quantity of initial video frames.

Figure 10:
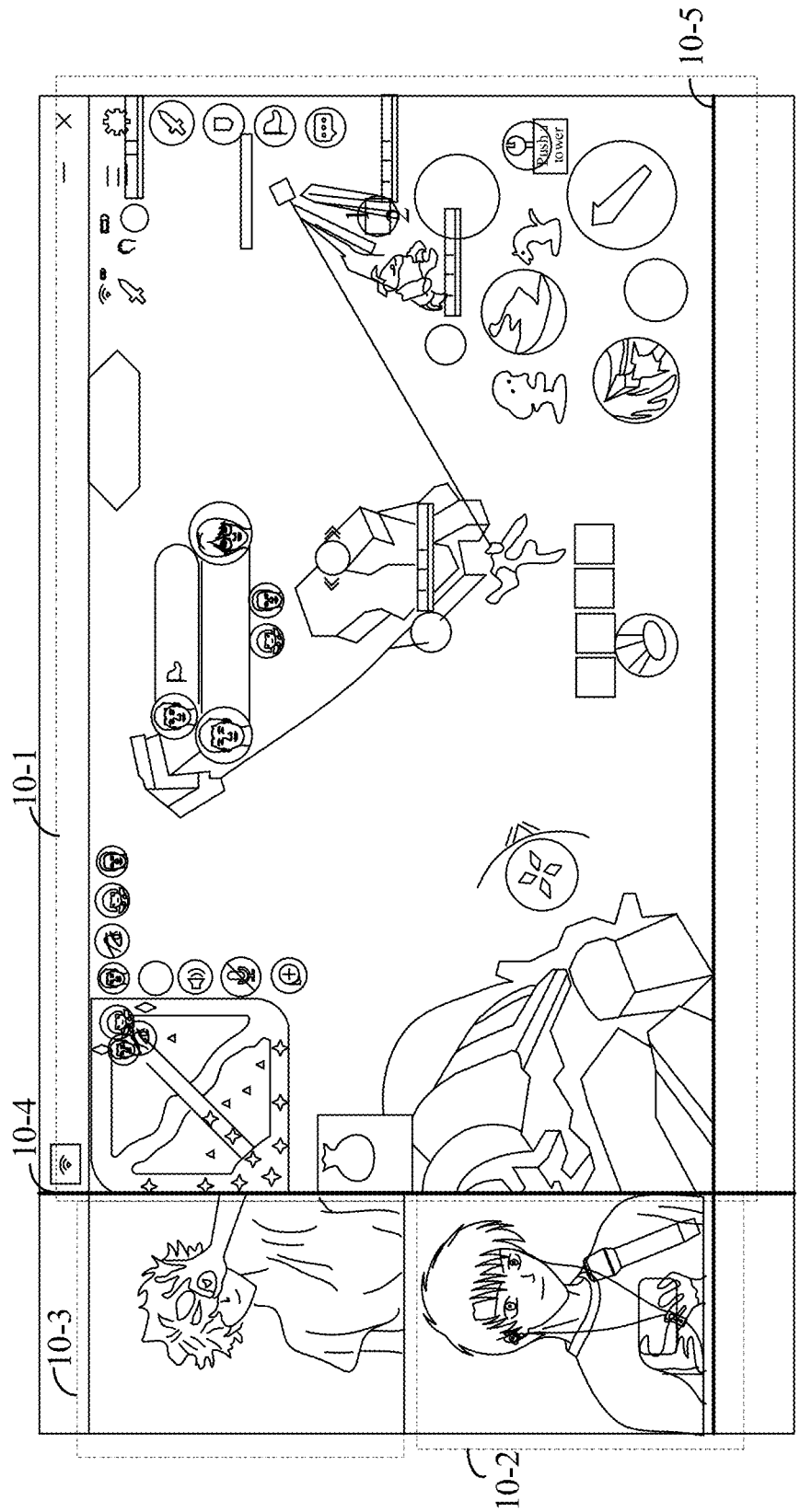
FIG. 10 is an exemplary diagram of cropping an initial video frame according to an embodiment of this application.

For example, FIG. 10 is an exemplary diagram of cropping an initial video frame according to an embodiment of this application. As shown in FIG. 10, the to-be-extracted video is a game video recorded by a user. In this case, the initial video frame is a frame in the game video recorded by the user. A display region 10-1 is a video playing region and displays picture content of the game video; a display region 10-2 displays a user operation video recorded synchronously when the game video is recorded; and a display region 10-3 is a preset cartoon animation page. After the server detects a video playing edge 10-4 and a video playing edge 10-5 respectively from the initial video frame by using an edge detection algorithm, the server crops the initial video frame by using the video playing edge 10-4 and the video playing edge 10-5, uses image content in the display region 10-1 as a video playing part, and uses image content in the display region 10-2 and image content in the display region 10-3 as non-video playing parts. Finally, the server uses the video playing part, that is, the image content in the display region 10-1, as an intermediate video frame, and deletes the non-video playing parts, that is, the image content in the display region 10-2 and the image content in the display region 10-3. In this way, the server obtains the intermediate video frame.

In this embodiment of this application, the server first performs edge detection on each initial video frame, to obtain a video playing edge, then crops each initial video frame into a video playing part and a non-video playing part according to the video playing edge, and finally integrates the video playing part to obtain at least one intermediate video frame. Therefore, impact of image content that is irrelevant to video content in a video picture on a subsequent recognition operation and event information extraction operation can be reduced, and the video labeling efficiency is further improved.

In some embodiments of this application, the recognizing, by the server, at least one to-be-processed video frame from the at least one intermediate video frame, that is, an implementation process of S110, may include S1101 to S1103 as follows.

S1101. The server performs feature extraction on each intermediate video frame in the at least one intermediate video frame, to obtain to-be-classified features.

When recognizing the at least one to-be-processed video frame, the server first performs feature extraction on each intermediate video frame by using a feature extraction model, and uses extracted features as to-be-classified features. In some embodiments of this application, the feature extraction model may be a CNN model, and the extracted to-be-classified features may be a plurality of feature maps corresponding to the intermediate video frames. The feature extraction model may be alternatively a feature point extraction model, and the extracted to-be-classified features may be feature points of the intermediate video frames.

S1102. The server classifies the to-be-classified features, to obtain a classification result corresponding to each intermediate video frame.

S1103. The server recognizes the at least one to-be-processed video frame from the at least one intermediate video frame according to the classification result.

The server classifies the to-be-classified features corresponding to each intermediate video frame by using a classification model, to obtain a classification result corresponding to each intermediate video frame. Subsequently, the server selects, according to the classification result, a to-be-processed video frame that needs to be processed from the at least one intermediate video frame, that is, obtains at least one to-be-processed video frame, and deletes another video frame that is not the to-be-processed video frame.

In some other embodiments of this application, one CNN may be used as the feature extraction model and the classification model simultaneously, or different models may be used as the feature extraction model and the classification model respectively. This is not limited in this embodiment of this application.

It may be understood that the classification model in this embodiment of this application is a model trained by using a preset image category. The preset image category matches content of the to-be-extracted video. For example, in a competitive game video, the preset image category may include a game battle frame, a game character selection frame, a battle result frame, a game loading frame, and a non-game video frame; and in a variety show video, the preset image category may include: a host opening introduction frame, a real person game frame, an audience interaction frame, a non-variety show video frame, and the like. The preset image category may be set according to an actual situation. This is not limited in this embodiment of this application.

When the classification model is trained, to ensure balance between samples, the server causes quantities of training images in preset image categories to be close as much as possible. For example, when the preset image category includes a game battle frame, a game character selection frame, a battle result frame, a game loading frame, and a non-game video frame, there may be 328 training images corresponding to the game battle frame, there may be 425 training images corresponding to the game character selection frame, there may be 252 training images corresponding to the battle result frame, there may be 349 training images corresponding to the game loading frame, and there may be 608 training images corresponding to the non-game video frame; and when the preset image category includes a host opening introduction frame, a real person game frame, an audience interaction frame, and a non-variety show video frame, quantities of training images corresponding to the host opening introduction frame, the real person game frame, the audience interaction frame, and the non-variety show video frame are 100 respectively.

Figure 11:
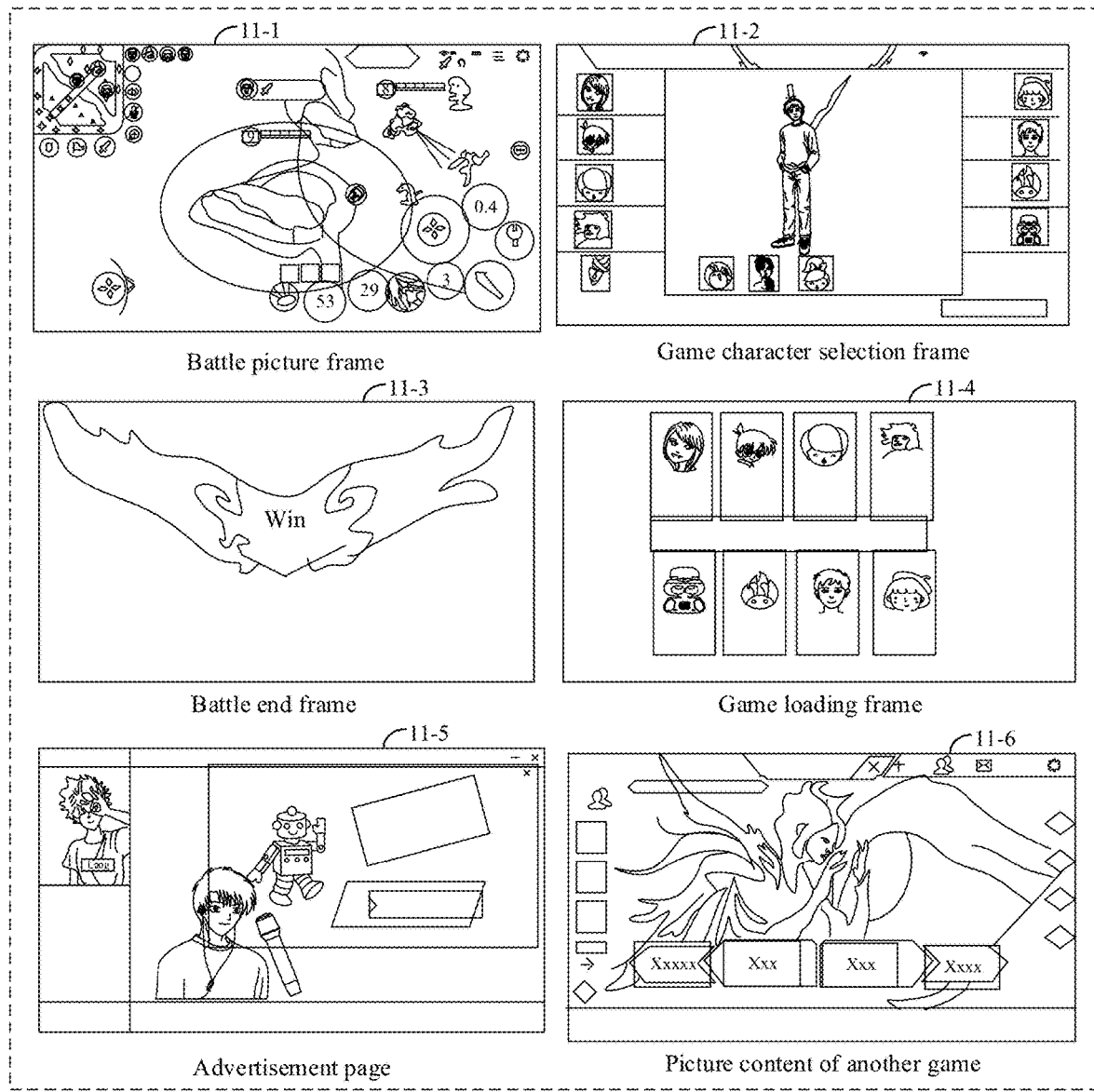
FIG. 11 is an exemplary diagram of recognizing a to-be-processed video frame according to a classification result according to an embodiment of this application.

For example, FIG. 11 is an exemplary diagram of recognizing a to-be-processed video frame according to a classification result according to an embodiment of this application. As shown in FIG. 11, when a to-be-extracted video is a competitive game video, a classification result of an intermediate video frame in a display region 11-1 is a battle picture frame, a classification result of an intermediate video frame in a display region 11-2 is a game character selection frame, a classification result of an intermediate video frame in a display region 11-3 is a battle end frame (an included battle result is "win"), a classification result of an intermediate video frame in a display region 11-4 is a game loading frame, and both classification results of intermediate video frames in a display region 11-5 and a display region 11-6 are non-game video frames. In some embodiments, an image in the display region 11-5 is an advertisement page popped up when a game video is paused, and an image in the display region 11-6 is picture content of another game. When obtaining the classification result of each intermediate video frame, the server selects intermediate recognition frames in the display region 11-1, the display region 11-2, the display region 11-3, and the display region 11-4 as to-be-processed video frames, and deletes the intermediate video frames in the display region 11-5 and the display region 11-6. In this way, the server completes a process of recognizing the to-be-processed video frames from the intermediate video frames.

In this embodiment of this application, the server can first perform feature extraction on each intermediate video frame, further obtain a classification result of each intermediate video frame, and then recognize at least one to-be-processed video frame from at least one intermediate video frame according to the classification result. Therefore, a subsequent event information extraction process is implemented based on the to-be-processed video frame, to reduce impact of irrelevant video frames on extraction of event information, thereby improving accuracy of video labeling.

In some embodiments of this application, after the recognizing, by the server, at least one to-be-processed video frame from the at least one intermediate video frame, that is, after S110, the method may further include S111 to S114 as follows.

S111. The server performs feature rearrangement on each to-be-processed video frame in the at least one to-be-processed video frame, to obtain at least one downscaled video frame;

The server first performs feature rearrangement on each to-be-processed video frame, so that loss of feature information in each to-be-processed video frame can be avoided while each to-be-processed video frame is scaled. The feature rearrangement refers to dividing each to-be-processed video frame into a plurality of feature blocks, and combining the plurality of feature blocks to form a downscaled video frame. In some embodiments, the server may divide each to-be-processed video frame into a plurality of sub-regions, subsequently divide each sub-region, to obtain sub-feature blocks, then extract a sub-feature block on the same position in each sub-region, and form a downscaled video frame by using the extracted sub-feature blocks. In this way, the server can obtain a quantity of downscaled video frames the same as a quantity of sub-regions.

Figure 12:
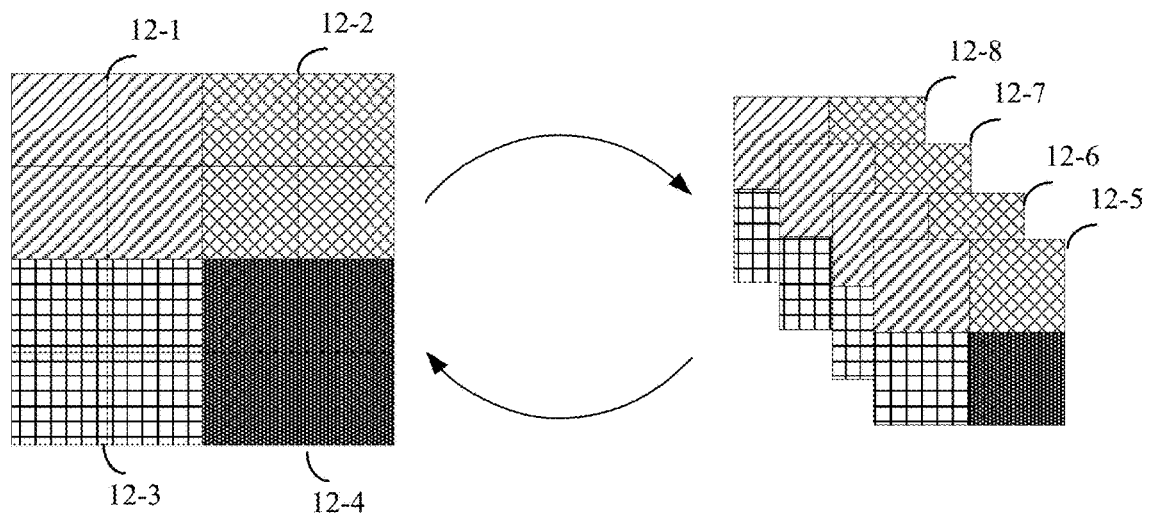
FIG. 12 is an exemplary diagram of performing feature rearrangement on a to-be-processed video frame according to an embodiment of this application.

For example, FIG. 12 is an exemplary diagram of performing feature rearrangement on a to-be-processed video frame according to an embodiment of this application. As shown in FIG. 12, the to-be-processed video frame is divided into four sub-regions, that is, a sub-region 12-1, a sub-region 12-2, a sub-region 12-3, and a sub-region 12-4, and then the server divides the four sub-regions and divides each sub-region into four sub-feature blocks of an upper left sub-feature block, an upper right sub-feature block, a lower left sub-feature block, and a lower right sub-feature block. Subsequently, the server splices the upper left sub-feature block in the sub-region 12-1, the upper left sub-feature block in the sub-region 12-2, the upper left sub-feature block in the sub-region 12-3, and the upper left sub-feature block in the sub-region 12-4 to form a downscaled video frame 12-5, splices the upper right sub-feature block in the sub-region 12-1, the upper right sub-feature block in the sub-region 12-2, the upper right sub-feature block in the sub-region 12-3, and the upper right sub-feature block in the sub-region 12-4, to form a downscaled video frame 12-6, splices the lower left sub-feature block in the sub-region 12-1, the lower left sub-feature block in the sub-region 12-2, the lower left sub-feature block in the sub-region 12-3, and the lower left sub-feature block in the sub-region 12-4, to form a downscaled video frame 12-7, and splices the lower right sub-feature block in the sub-region 12-1, the lower right sub-feature block in the sub-region 12-2, the lower right sub-feature block in the sub-region 12-3, and the lower right sub-feature block in the sub-region 12-4, to form a downscaled video frame 12-8. Therefore, the server obtains at least one downscaled video frame.

S112. The server generates a feature map for each downscaled video frame in the at least one downscaled video frame, to obtain at least one feature map, the feature map having an image feature of the downscaled video frame.

Next, the server generates a feature map for each downscaled video frame. In this way, the server can obtain at least one feature map. It may be understood that in this embodiment of this application, the server may generate the feature map by using a CNN mode, or may generate the feature map by using another model such as a shallow neural network. This is not limited in this embodiment of this application.

S113. The server enlarges a size of each feature map in the at least one feature map, to obtain at least one enlarged feature map.

The server enlarges a size of each feature map, and records an obtained feature map as an enlarged feature map. Because the server obtains the downscaled video frame according to a feature rearrangement process in S111, the server needs to obtain the enlarged feature map according to an inverse process of feature rearrangement. In some embodiments, the server splits each enlarged feature map according to the same rule as when feature rearrangement is performed, to obtain enlarged sub-feature blocks, and then splices all enlarged sub-feature blocks in the same position, to form one sub-region of the enlarged feature map. After obtaining all sub-regions of the enlarged feature maps, the server can obtain the enlarged feature maps.

S114. The server constructs, by using the at least one enlarged feature map and the at least one to-be-processed video frame, at least one to-be-processed video frame of which a resolution has been enhanced, the at least one to-be-processed video frame of which a resolution has been enhanced being used for extracting the event information.

The server causes an enlarged feature map to correspond to an original to-be-processed video frame, inputs both the enlarged feature map and the to-be-processed video frame into a construction model, and reconstructs each pixel in the to-be-processed video frame by using the construction model, to construct a to-be-processed video frame of which a resolution has been enhanced, so that an event information extraction operation is performed on the to-be-processed video frames of which resolutions have been enhanced, to obtain more accurate event information.

In this embodiment of this application, after obtaining at least one to-be-processed video frame of which a resolution has been enhanced, the server may extract event information from the to-be-processed video frame of which the resolution has been enhanced, that is, extract event information from each to-be-processed video frame of which a resolution has been enhanced of the at least one to-be-processed video frame of which the resolution has been resolution.

In this embodiment of this application, because the to-be-extracted video is encoded and decoded during transmission, resolutions of the video frames of the to-be-extracted video are reduced. In this case, when the event information is directly extracted from the video frames of the to-be-extracted video, the extracted event information has a relatively large error. Therefore, the server may obtain a to-be-processed video frame of which a resolution has been enhanced through processes of performing feature rearrangement on a to-be-processed video frame, generating a feature map, enlarging a size of the feature map, and constructing a high-resolution image, and then extract event information from the to-be-processed video frame of which the resolution has been enhanced, to improve accuracy of extraction of event information.

It may be understood that the server may implement an implementation process in step S111 to step S114 by using a CNN model. In the CNN model, a feature rearrangement module, a feature map generation module, a feature size enlarging module, and a pixel reconstruction module are set in sequence. The feature rearrangement module may be implemented by using a subpixel deconvolutional layer (that is, a desubpixel layer), the feature map generation module may be implemented by using a plurality of convolutional layers, the feature size enlarging module may be implemented by using a subpixel convolutional layer (that is, a subpixel layer), and the pixel reconstruction module may be implemented by using a loss function. In some embodiments, there may be further an additive module. An enlarged feature map outputted by the feature size enlarging module and an inputted video frame are fused, and then pixel reconstruction is performed on the fused video frame by using the pixel reconstruction module. In some embodiments of this application, the CNN model may be trained by using training data generated by the server. To reduce workload of manually capturing low-resolution images and corresponding high-resolution images, when generating the training data, the server may first obtain high-definition video images, compress the high-definition video images, to obtain low-definition video images, perform data enhancement on the low-definition video images (that is, operations such as random capturing and rotation are performed, to enhance the low-definition video images), to obtain a large quantity of high-definition video images and low-definition video images that are matched, and then use both the high-definition video images and the low-definition video images as the training data to train the CNN model. In this way, after obtaining a low-definition to-be-processed video frame, the obtained CNN model may output a to-be-processed video frame of which a resolution has been enhanced.

Figure 13:
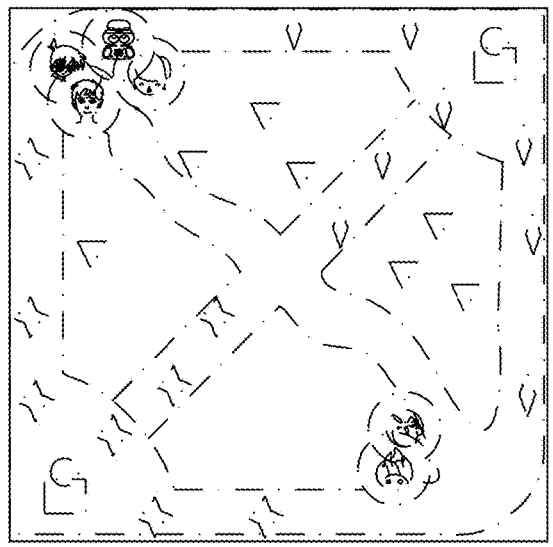
FIG. 13 is an exemplary diagram of comparison between a to-be-processed video frame and a to-be-processed video frame of which a resolution has been enhanced according to an embodiment of this application.
Figure 13:
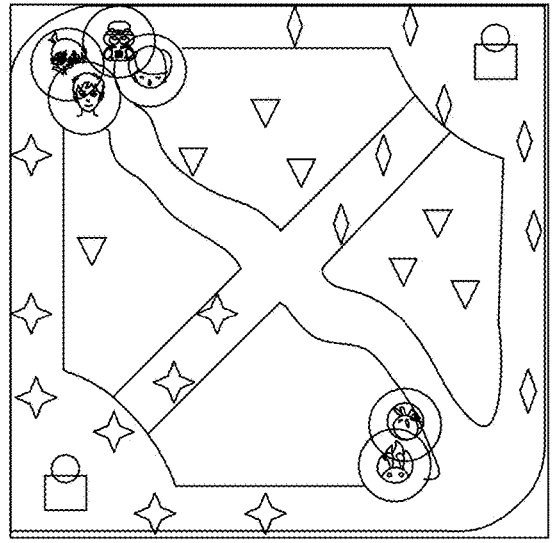

For example, FIG. 13 is an exemplary diagram of comparison between a to-be-processed video frame and a to-be-processed video frame of which a resolution has been enhanced according to an embodiment of this application. As shown in FIG. 13, a to-be-processed video frame is a small map image 13-1 in a competitive game video, and a resolution of the small map image 13-1 is relatively low, resulting in that content in a small map in the competitive game video in FIG. 13 is not very clear. When event information is directly extracted from the small map image 13-1, there may be a relatively large error in the extracted event information. For example, there is an error in coordinates of an extracted game character. After performing a series of processing such as feature rearrangement, feature map generation, and size enlarging on the small map image 13-1 by using the CNN model, the server may obtain an enlarged feature map corresponding to the small map image 13-1, and further obtain, by using the feature map and the small map image 13-1, a small map image 13-2 of which a resolution has been enhanced. It can be learned from FIG. 13 that, the small map image 13-2 of which the resolution has been enhanced is clearer than the unprocessed small map image 13-1, and accuracy of event information extracted from the small map image 13-2 of which the resolution has been enhanced is higher. When training the CNN model, the server may obtain a high-definition small map image and a profile picture of a game character from a setup package of the competitive game video, and then obtain a high-definition small map image (1024×1024) by randomly placing and moving the profile picture of the game character on the small map. Subsequently, the server compresses the high-definition small map image, to obtain a low-definition small map image (256×256) of which a resolution is ¼ the high-definition small map image, randomly captures a small map image block (128×128) from the low-definition small map image for data enhancement simultaneously, and finally trains the CNN model by using the low-definition small map image and the small map image block as input values and the high-definition small map image and a high-definition small map image block corresponding to the small map image block as real values.

In this embodiment of this application, the server can construct a to-be-processed video frame of which a resolution has been enhanced for each to-be-processed video frame, so that the server can extract event information from the to-be-processed video frame of which the resolution has been enhanced, to improve accuracy of extraction of event information.

In some embodiments of this application, after the extracting, by the server, event information from video frames of the to-be-extracted video, and before the forming, by the server, at least one event information flow by using the event information, that is, after S102, and before S103, the method may further include S115 to S117 as follows.

S115. The server obtains adjacent video frames of a current video frame from the video frames of the to-be-extracted video.

In this embodiment of this application, adjacent video frames include a previous video frame of a current video frame and a next video frame of the current video frame. The server obtains adjacent frames of a video frame that is to be processed at a current moment, that is, a current video frame from all the video frames of the to-be-extracted video, that is, obtains a previous video frame of the current video frame and a next video frame of the current video frame, and forms the adjacent video frames by using the previous video frame of the current video frame and the next video frame of the current video frame. The current video frame is any video frame in the video frames of the to-be-extracted video.

S116. The server performs statistics on event information in the adjacent video frames, to obtain a statistical result.

S117. The server corrects event information of the current video frame according to the statistical result, to obtain one or more corrected event information of the current video frame, and obtains one or more corrected event information corresponding to the video frames of the to-be-extracted video when the event information of all the video frames of to-be-extracted video is corrected.

It may be understood that one or more corrected event information is used for forming at least one event information flow, so that the at least one event information flow is more accurate, and the accuracy of video labeling is improved.

The server obtains event information in the adjacent video frames, and writes the event information in the adjacent video frames into a statistical result. Subsequently, the server compares an obtained statistical result with each event information of the current video frame. When event information is the same as the statistical result, the event information is retained. When event information is different from the statistical result, the event information is corrected according to the principles of subordinate of the minority to the majority and subordinate of the low probability to the high probability, to obtain corrected event information of the current video frame. These processes are repeated until event information of the video frames is corrected, to obtain one or more corrected event information corresponding to the video frames. Subsequently, the server may form at least one event information flow by using the one or more corrected event information, to improve accuracy of event information.

When correcting the event information according to the principles of subordinate of the minority to the majority and subordinate of the low probability to the high probability, the server compares the event information of the current video frame with event information of the previous video frame of the current video frame as well as event information of the next video frame of the current video frame. When the event information of the current video frame is the same as the event information of the adjacent video frames, the event information of the current video frame is directly used as corrected event information. When the event information of the current video frame is different from the event information of the adjacent video frames, the event information of the previous video frame of the current video frame is compared with the event information of the next video frame of the current video frame. When the event information of the two frames is the same, the event information of the current video frame is replaced with the event information of the two frames, and when the event information of the two frames is different, an appearance probability of the event information of the current video frame is compared with appearance probabilities of the event information of the adjacent video frames, and the event information with a large appearance probability is selected as finally corrected event information.

Figure 14:
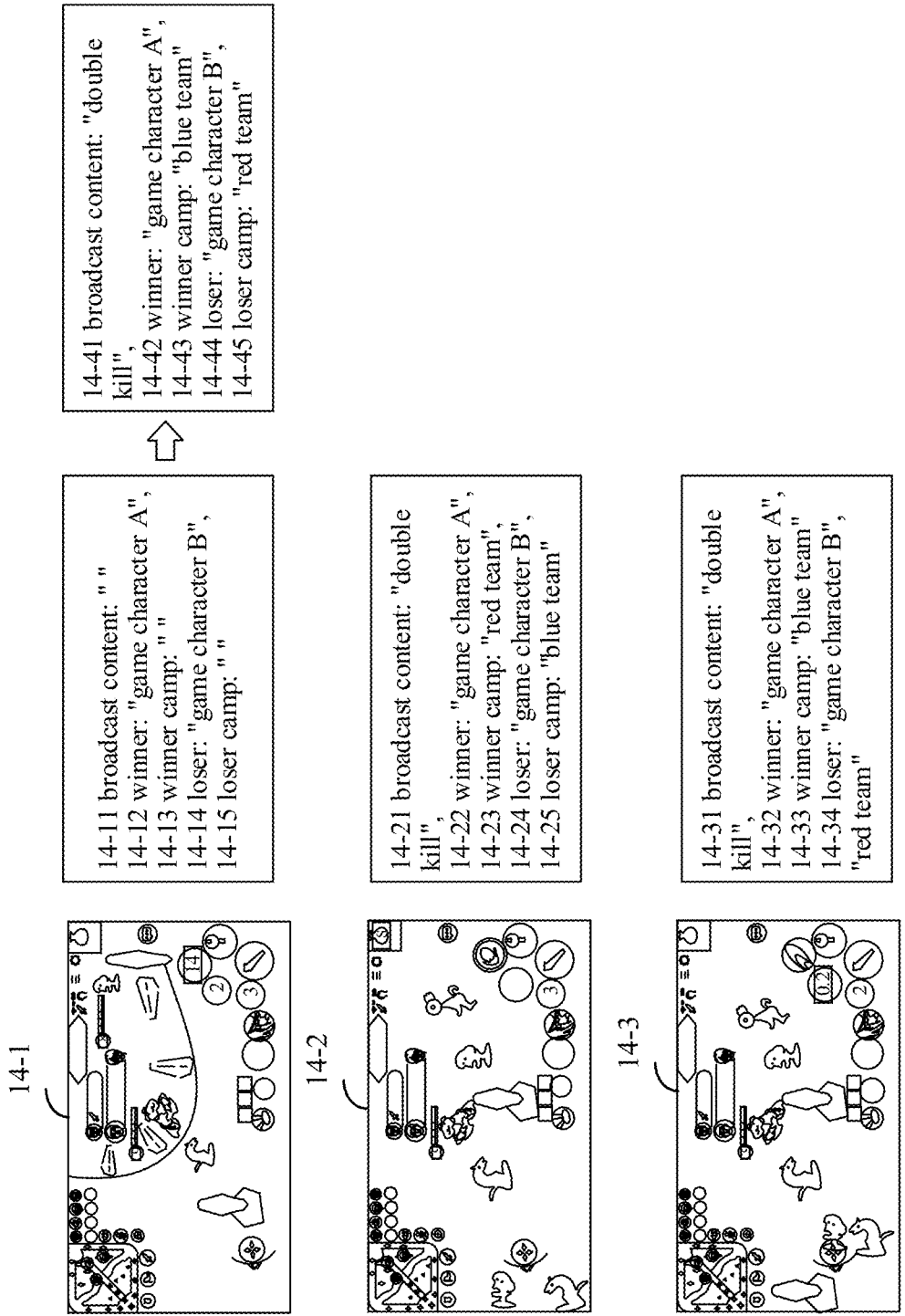
FIG. 14 is an exemplary diagram of obtaining corrected event information according to an embodiment of this application.

For example, FIG. 14 is an exemplary diagram of obtaining corrected event information according to an embodiment of this application. As shown in FIG. 14, a to-be-extracted video is a competitive game video, event information 14-11 corresponding to a current video frame 14-1 is broadcast content: " ", event information 14-12 is a winner: "a game character A", event information 14-13 is a winner camp: " ", event information 14-14 is a loser: "a game character B", and event information 14-15 is a loser camp: " ", the event information 14-11 and the event information 14-14 being event information that is not detected. Event information 14-21 corresponding to a next video frame 14-2 of the current video frame is broadcast content: "double kill", event information 14-22 is a winner: "a game character A", event information 14-23 is a winner camp: "a red team", event information 14-24 is a loser: "a game character B", and event information 14-25 is a loser camp: "a blue team", the event information 14-23 being event information that is detected falsely. Event information 14-31 corresponding to a previous video frame 14-3 of the current video frame is broadcast content "double kill", event information 14-32 is a winner: "a game character A", event information 14-33 is a winner camp: "a blue team", event information 14-34 is a loser: "a game character B", and event information 14-35 is a loser camp: "a red team". The server respectively compares the event information corresponding to the current video frame 14-1 with the event information corresponding to the next video frame 14-2 of the current video frame as well as the event information corresponding to the previous video frame 14-3 of the current video frame, and obtains corrected event information of the current video frame 14-1 according to the principles of subordinate of the minority to the majority and subordinate of the low probability to the high probability. As shown in FIG. 14, corrected event information 14-41 is broadcast content: "double kill", corrected event information 14-42 is a winner: "a game character A", corrected event information 14-43 is a winner camp: "a blue team", corrected event information 14-44 is a loser: "a game character B", and corrected event information 14-45 is a loser camp: "a red team" (an appearance probability of the event information 14-23 of a loser camp: "a red team" is smaller than an appearance probability of the event information 14-33 of a winner camp: "a blue team"; and an appearance probability of the event information 14-25 of a loser camp: "a blue team" is smaller than an appearance probability of the event information 14-35 of a loser camp: "a red team"). Therefore, the server obtains the corrected event information.

In this embodiment of this application, the server may correct event information of a current video frame by using time information in adjacent video frames of the current video frame, to obtain corrected event information of the video frame. Therefore, an event information flow can be formed by using the corrected event information, thereby improving accuracy of video labeling.

In some embodiments of this application, after the extracting, by the server, event information from video frames of the to-be-extracted video, that is, after S102, the method may further include S118 as follows.

S118. The server performs structured arrangement on the event information, to obtain and store structured event information corresponding to the video frames.

The server performs structured processing on all event information in the event information corresponding to the video frames by using a structured template designed in advance, and an obtained processing result is structured event information corresponding to each to-be-processed video frame. Subsequently, the server may store the structured event information into a database, so that the event information is stored in a structured form, and when the event information needs to be used subsequently, the event information can be obtained from the structured event information, and a wonderful clip is captured based on the event information.

For example, FIG. 15 is an exemplary diagram of structured information according to an embodiment of this application. As shown in FIG. 15, there is structured information of a video frame in a game video. In the structured event information, _id represents a number of a video frame, that is, a current video frame is a 1647$^{th}$ video frame. v_id represents an id (not shown) of a to-be-extracted video, and only one to-be-extracted video may be queried by using the id. ret_hero_msg information about a game character, location: [668, 307] is coordinates of the game character, life_value: 10 represents that a life value level of the game character is 10, level: 4 represents that a level of the game character is 4, and blue represents that the game character belongs to a blue camp. ret_broadcast is broadcast information in the video frame, broadcast_id: 1 represents that current broadcast information is first information in a broadcast information set, broadcast_text: "defeat" represents that content of the current broadcast information is defeat, winner refers to a winning side, loser refers to a losing side, hero id is a number of the game character, hero name is a name of the game character in a game, and camp is a camp to which the game character belongs. It can be learned from FIG. 15 that a game character with a number of 2618 and a name of a human name-1 in the red camp defeats a game character with a number of 2572 and a name of a human name-2 in the blue camp. ret_grass represents grass information, in_grass: 0 represents no game character in the grass, and in_grass: 1 represents that the game character is in the grass. As can be learned that no game character in the blue camp is in the grass. ret_tower is building information in the video frame, red represents a building of the red camp, blue represents a building of the blue camp, and 1: [799, 170] represents coordinates information of a building with a number of 1. After obtaining the structured event information, the server may store the structured event information into the database for subsequent use.

In this embodiment of this application, the server can perform structured arrangement on event information, to obtain and store structured event information corresponding to video frames. Therefore, event information is clear and well-arranged, and subsequent use of the event information is facilitated.

In some embodiments of this application, after the displaying, by the terminal, the labeled information in a display region when the to-be-extracted video is displayed, that is, after S107, the method may further include S119 and S120 as follows.

S119. The terminal receives a video clip playing instruction for sub-labeled information in the labeled information in the display region.

S120. The terminal plays a target first clip corresponding to the sub-labeled information in a video clip playing region in response to the video clip playing instruction, the video clip playing region being a second preset region located in the display interface and not covering the first preset region, and the target first clip being a first clip corresponding to the sub-labeled information in the at least one first clip.

The labeled information is a set of labeling the at least one first clip respectively, and the labeled information includes sub-labeled information corresponding to each first clip. After obtaining the labeled information, the terminal may further generate a corresponding video clip playing identifier for each sub-labeled information in the labeled information, so that the user may plays a corresponding first clip by clicking the identifier. The terminal receives, in the display region, a video clip playing instruction triggered by the user for the sub-labeled information in the labeled information, that is, the terminal receives the video clip playing instruction triggered by the user at the video clip playing identifier, then determines, according to the video clip playing instruction, a target first clip that needs to be played, and finally displays the target first clip in a pre-planned video clip playing region. The video clip playing region may be set in the second preset region and does not cover the first preset region. Therefore, the user may learn that the to-be-extracted video has which first clips and a first clip in the first clips is played.

It may be understood that the second preset region may be set according to an actual situation. This is not limited in this embodiment of this application. For example, the terminal sets the second preset region between a playing region of the to-be-extracted video and the first preset region, or may set the second preset region in another region, for example, below the first preset region. This is not limited in this embodiment of this application.

In some other embodiments of this application, the video clip playing region may be alternatively a floating window popped up after the user performs a click operation. This is not limited in this embodiment of this application.

Figure 16:
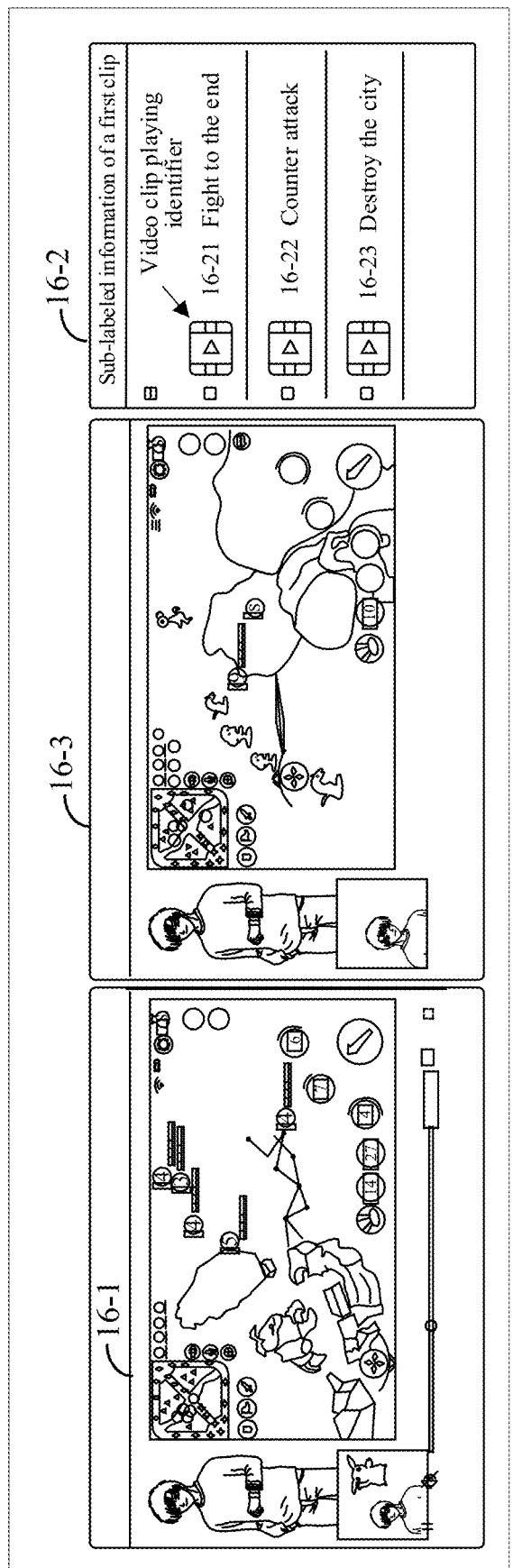
FIG. 16 is an exemplary diagram of displaying a first clip according to an embodiment of this application.

For example, FIG. 16 is an exemplary diagram of displaying a first clip according to an embodiment of this application. As shown in FIG. 16, a display region 16-1 is a playing region of a to-be-extracted video, and the to-be-extracted video may be played in the display region, and a display region 16-2 is a display region used for displaying labeled information. As an example, sub-labeled information: fight to the end of a first clip 16-21, sub-labeled information: counter attack of a first clip 16-22, and sub-labeled information: destroy the city of a first clip 16-23 are displayed in the display region 16-2. In addition, the terminal further sets corresponding video clip playing identifiers for the sub-labeled information, so that the user selects a first clip to be played by clicking the video clip playing identifier next to the sub-labeled information. A display region 16-3 is a video clip playing region. When the user clicks a first clip playing identifier next to the sub-labeled information of the first clip 16-21 through a click operation, the terminal displays the first clip 16-21 in the display region 16-3, to play a wonderful clip selected by the user.

In this embodiment of this application, the terminal can receive a video clip playing instruction triggered by a user, and displays a first clip in a video clip playing region of a display interface according to the instruction, so that the user can directly watch the first clip.

The following describes an exemplary application of this embodiment of this application in an actual application scenario.

Figure 17:
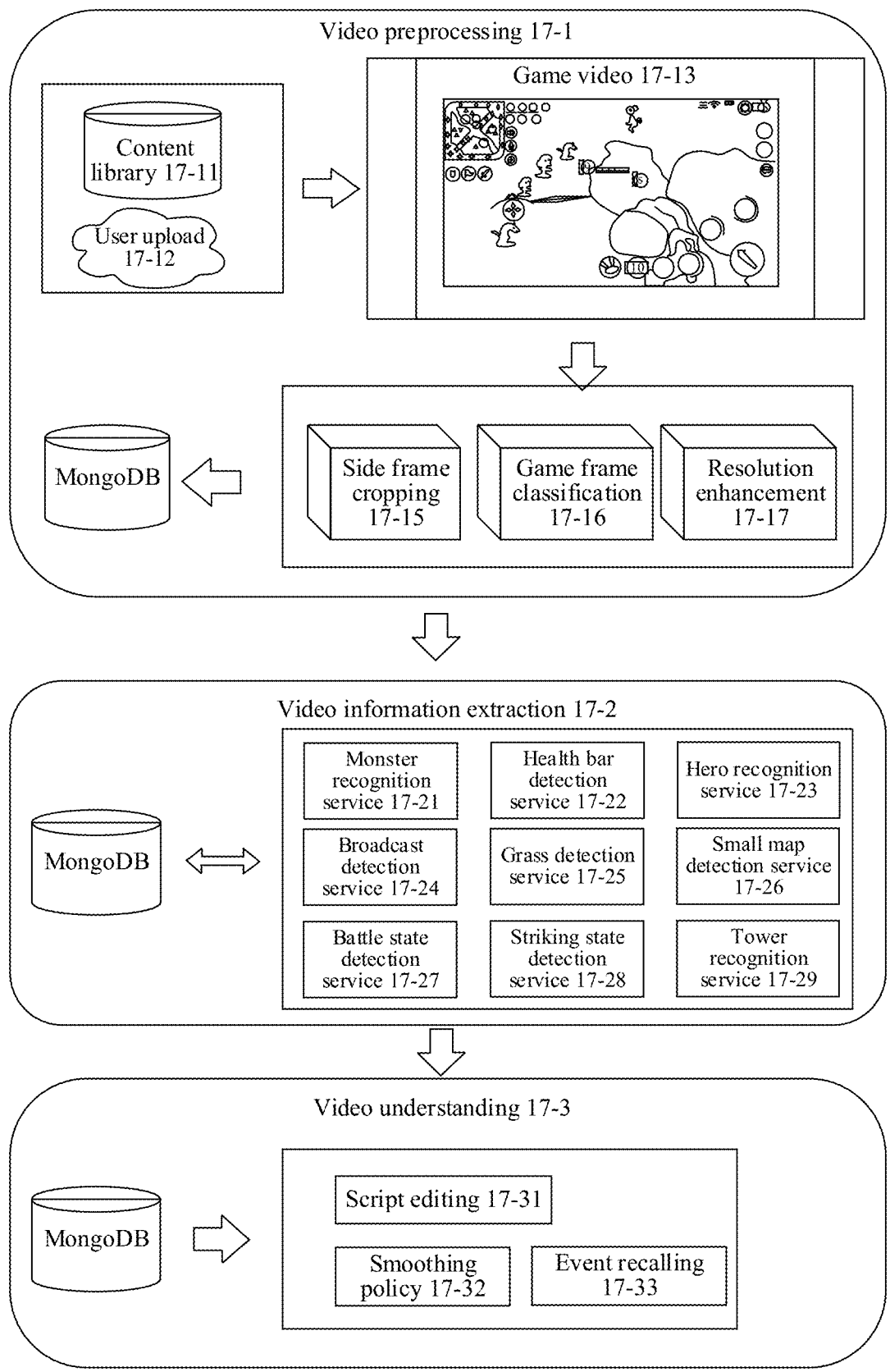
FIG. 17 is an exemplary diagram of a video labeling process of a competitive game video according to an embodiment of this application.

In this embodiment of this application, the method is implemented in a scenario of performing video labeling on a competitive game video. FIG. 17 is an exemplary diagram of a process of performing video labeling on a competitive game video according to an embodiment of this application. A video labeling process provided in this embodiment of this application mainly includes three main steps of video pre-processing 17-1, video information extraction 17-2, and video understanding 17-3.

During video preprocessing 17-1, a game video 17-13 is obtained from a content library 17-11 (a game video is obtained according to a video extraction instruction), or is uploaded by a user 17-12 (a to-be-extracted video is carried in the video extraction instruction). After obtaining the game video 17-13, the server may perform operations such as video frame extraction 17-14 (an extracted video frame is not shown), side frame cropping 17-15 (cropping processing), a game frame classification 17-16 (recognizing a to-be-processed video frame), and resolution enhancement 17-17 on the game video 17-13, and store the processed video frame in a MongoDB database.

Figure 18:
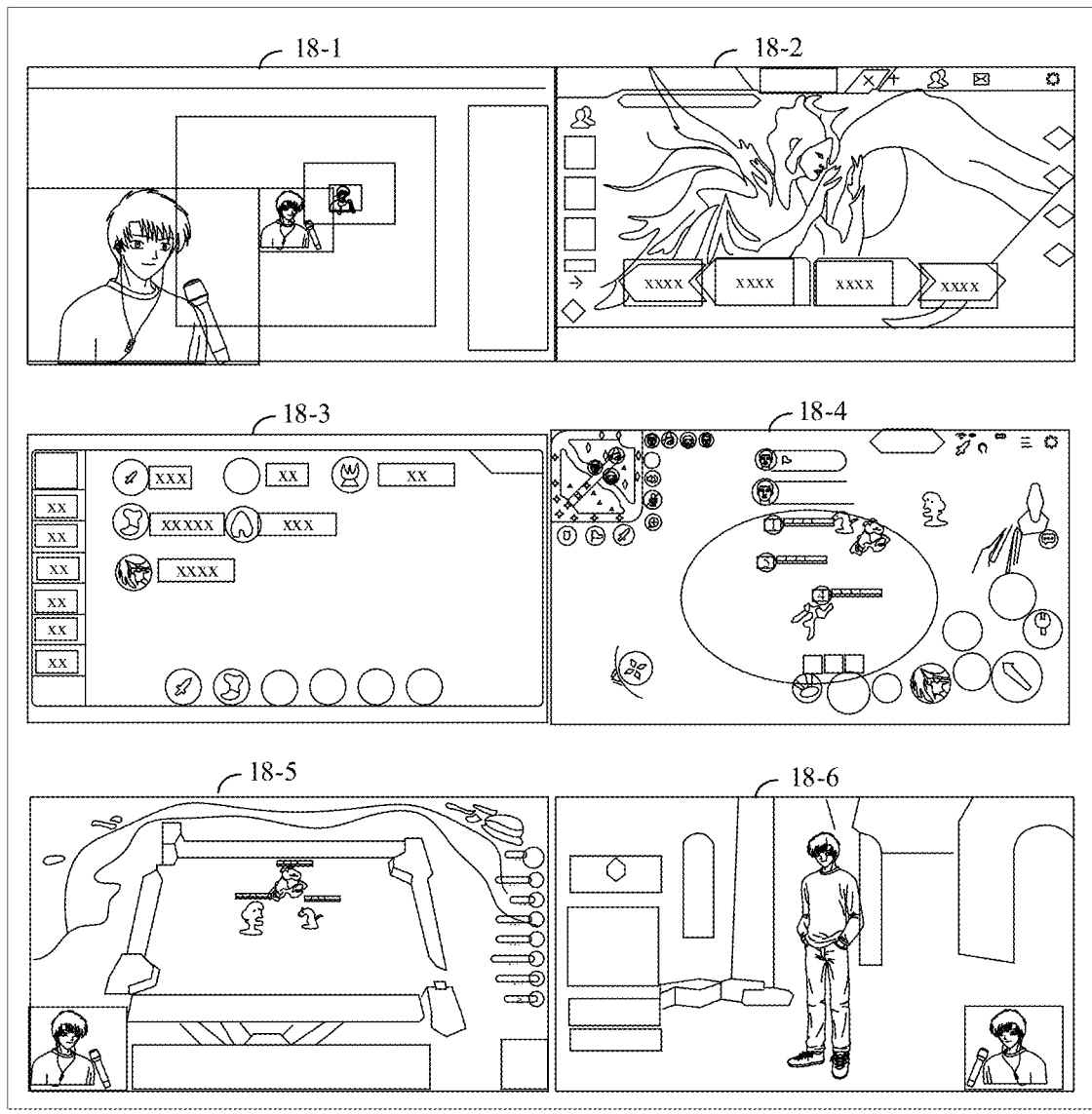
FIG. 18 is some video frames in a game video according to an embodiment of this application.

In some embodiments, the server may first read all video frame data (full video frames) of the game video 17-13 frame by frame, and extract one frame of data at a frame extraction interval, which is named as 1. png, a second frame being named as 2. png, and by analogy, an $N^{th}$ frame is named as N. png. After frame extraction is completed, playing moments corresponding to the video frames may be obtained according to formula (8), to implement uniform frame extraction, and data on which frame extraction is performed corresponds to the playing moments of the video frames in the game video. In the game video 17-13, there may be a form of picture in picture, that is, a side frame is added to a game picture. In this case, if the operation of game frame classification 17-16 is directly performed, there is relatively strong interference. In this case, the server detects the side frame (a video playing edge) of the game picture based on canny edge detection and Hough line detection methods, and performs side frame cropping 17-15 to obtain a pure-game picture (a video playing part is obtained through cropping, and the video playing part is used as an intermediate video frame) In the game video, there may be a large quantity of non-game video frames such as a hosting chatting picture, a game login picture, a game store picture, and another game picture, and the game video frame also includes different types of information. For example, a game character selection interface and a game loading page include information about heroes (game characters) of this round, a battle end page includes battle win or loss information, and a battle process frame includes battle process information. The server needs to distinguish the content through game frame classification 17-16, and filters out useless video frames (removes another video frame), to improve efficiency of a video labeling process. For example, FIG. 18 is some video frames in a game video. A video frame 18-1 is a host chatting picture, a video frame 18-2 is a game lobby interface, a video frame 18-3 is a game store interface, a video frame 18-4 is a battle process picture, and both a video frame 18-5 and a video frame 18-6 are other game interfaces.

Figure 19:
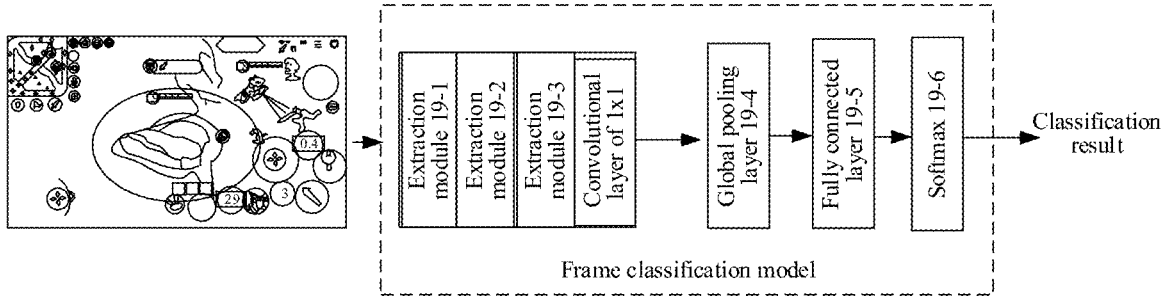
FIG. 19 is an exemplary diagram of a frame classification model according to an embodiment of this application.

FIG. 19 is an exemplary diagram of a frame classification model according to an embodiment of this application. The server may implement the game frame classification 17-16 based on a classification model of the CNN. The game frame classification 17-16 is performed by using the frame classification model provided in FIG. 19 herein. It can be learned from FIG. 19 that the frame classification model has three feature extraction modules, which are an extraction module 19-1, an extraction module 19-2, and an extraction module 19-3 respectively, and there is also a convolutional layer of 1×1 after the three extraction modules. A plurality of feature maps can be obtained after the video frames of the game video 17-13 pass the three extraction modules and the convolutional layer of 1×1, subsequently, the feature maps need to pass a global pooling layer 19-4, a fully connected layer 19-5, and a softmax layer 19-6 and a classification result may be obtained, and then the server may determine, according to the classification result, whether the video frames of the game video 17-13 are retained or filtered out.

Figure 20:
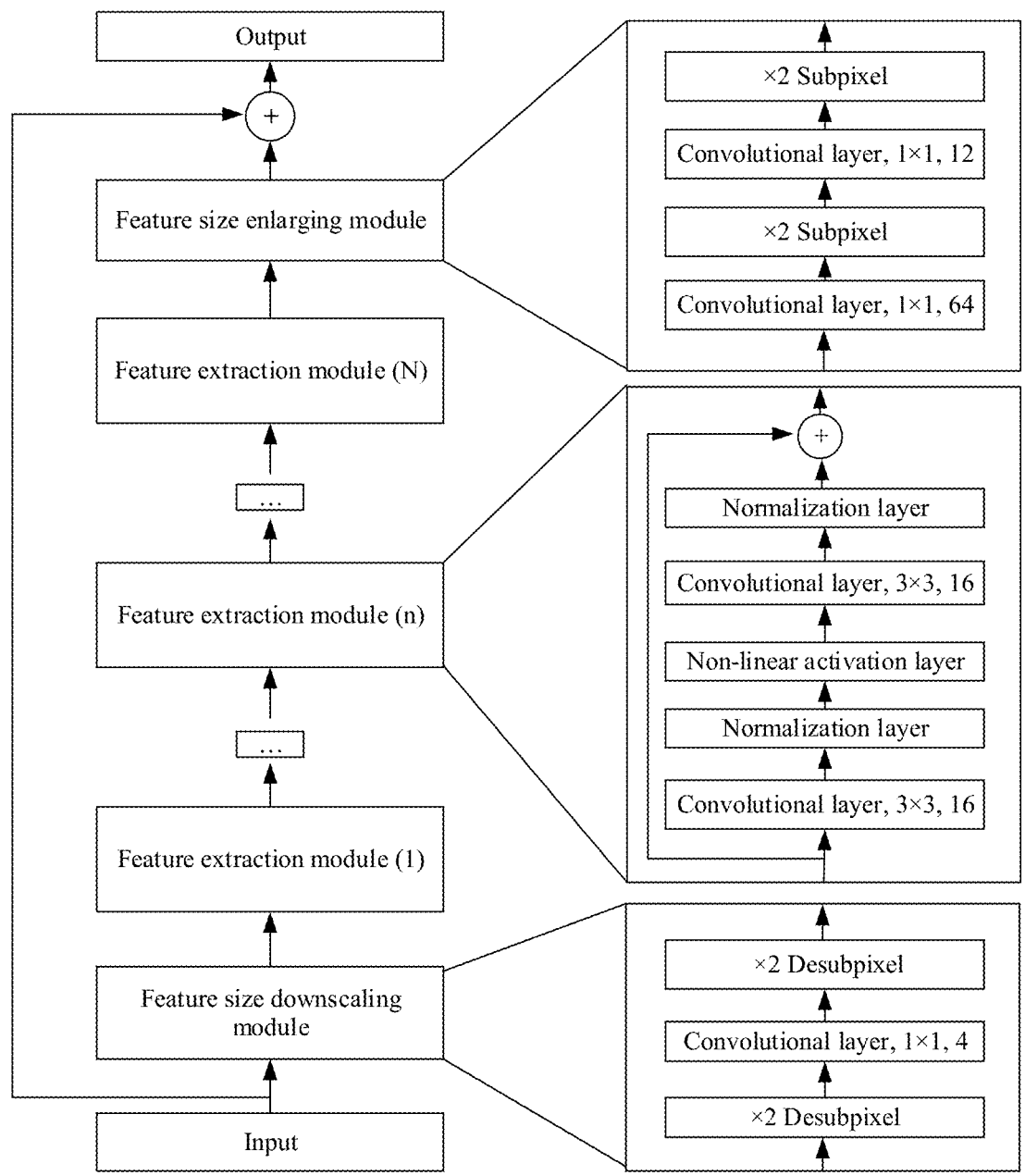
FIG. 20 is an exemplary diagram of a resolution enhancement model according to an embodiment of this application.

FIG. 20 is an exemplary diagram of a resolution enhancement model according to an embodiment of this application. When performing resolution enhancement 17-17, the server selects the resolution enhancement model provided in FIG. 20. The video frames of the game video 17-13 pass the feature size scaling module (which has two subpixel deconvolutional layers ×2, that is, a desubpixel layer ×2, and a convolutional layer of 1×1 of four channels), pass a plurality of feature extraction modules (an $n^{th}$ feature extraction module has two convolutional layers of 3×3 of 16 channels, two normalization layers, one non-linear activation layer, and one additive module, the additive module adding and outputting inputs of the feature extraction modules and inputs of the normalization layers of the feature extraction modules, n being greater than or equal to 1 and less than or equal to N), and then pass the feature size enlarging module (which has one convolutional layer of 1×1 of 64 channels, one convolutional layer of 1×1 of 12 channels, and two subpixel convolutional layers ×2, that is, subpixel layers ×2), obtained feature maps are fused with the originally inputted video frames of the game video 17-13, and pixel reconstruction is performed on a fused result by using an MSE loss, so that a high-definition frame image can be obtained (a to-be-processed video frame of which a resolution has been enhanced).

During video information extraction 17-2, the server may perform a monster recognition service 17-21, a health bar detection service 17-22, a hero recognition service 17-23, a broadcast detection service 17-24, a grass detection service 17-25, a small map detection service 17-26, a battle state detection service 17-27, a striking state detection service 17-28, and a tower recognition service 17-29 on the video frames of the game video 17-13, and store results of the detection obtained in the detection processes into the MongDB database.

Figure 21:
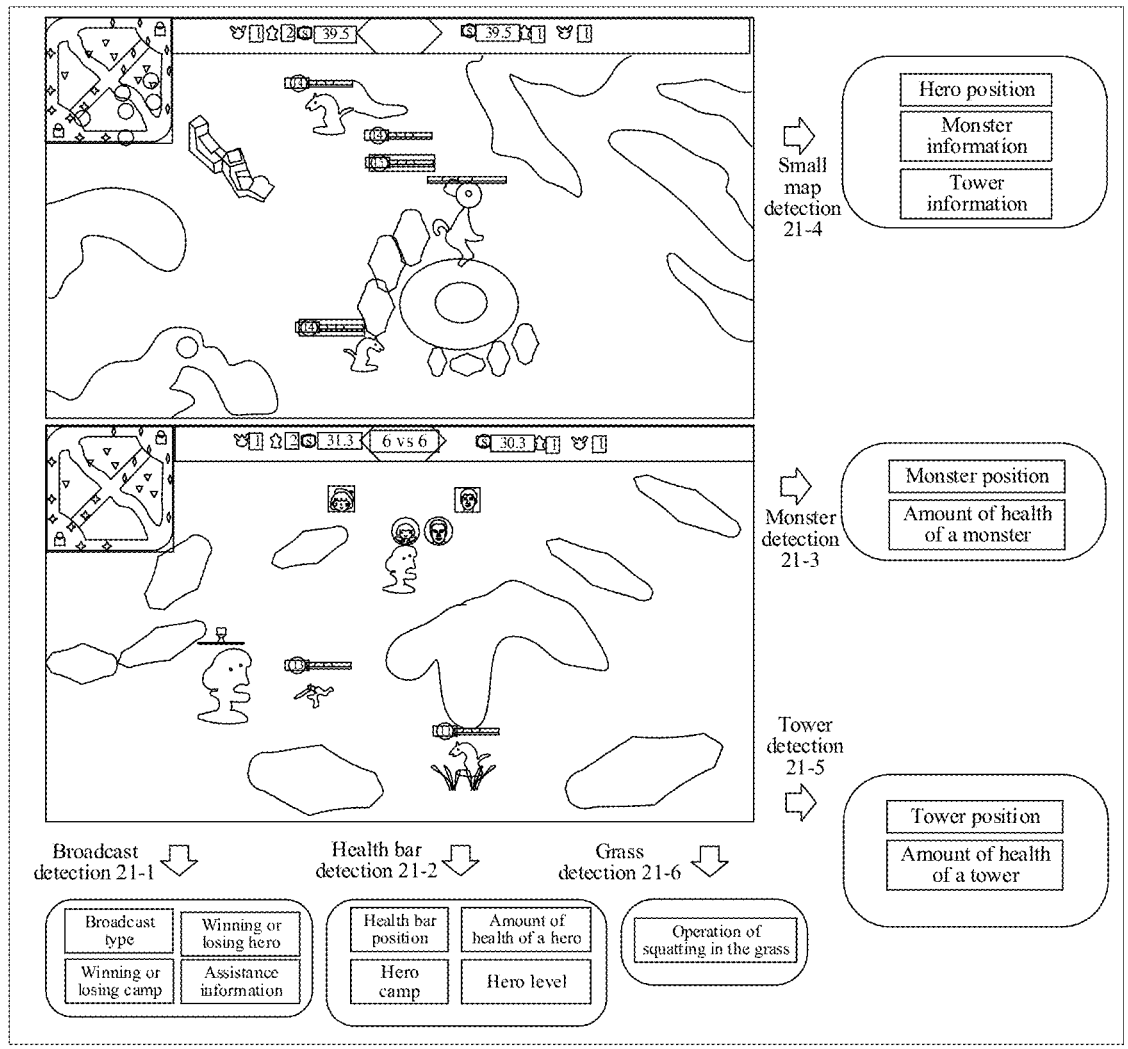
FIG. 21 is an exemplary diagram of performing video information extraction on a game video according to an embodiment of this application.

FIG. 21 is an exemplary diagram of performing video information extraction on a game video. The server may perform broadcast detection 21-1 on video frames based on ORB features, to obtain a broadcast type, a winning or losing hero, a winning or losing camp, and assistance information; perform health bar detection 21-2 on the video frames by using a template matching method, to obtain a health bar position, an amount of health of a hero, a hero camp, and a hero level; perform monster detection 21-3 on the video frames by using the template matching method, to obtain a monster position and an amount of health of a monster; perform small map detection 21-4 on the video frames based on the ORB features (video image feature points), to obtain a hero position, monster information, and tower information; perform tower detection 21-5 on the video frames by using the template matching method, to obtain a tower position and an amount of health of a tower; and perform grass detection 21-6 on the video frames by using a convolutional neural network (a preset event detection model), to obtain an operation of squatting in the grass. In this way, the server completes video information extraction of the game video 17-13. The small map detection is used as an example to describe that detection operations are completed based on ORB features below. The server extracts ORB features of a small map template and ORB features of the video frames of the game video 17-13 respectively, then performs feature value comparison pixel by pixel, extracts feature points that have relatively high similarity to that of the small map template, and positions a small map region according to the feature points, to crop the small map region.

Because a health bar, broadcast, a tower, a monster, a grass, and a small map (which are event information) are basic element information in a competitive game, the server may perform structured processing on basic element information in each video frame in a form of FIG. 13, to obtain structured data of each frame (structured event information).

During video understanding 17-3, before starting video labeling, the server first performs script editing 17-31, obtains data that needs to be used from the MongDB database in the video labeling process, and then perform a smoothing policy 17-32 (correcting event information) and event recalling 17-33. In the smoothing policy 17-32, the server first implements false detection elimination and missed detection compensation by performing smoothing and closure processing with reference information about front and rear frames, that is, corrects a false detection result, and fills a missed detection result by using information about adjacent frames (a result after the filling is corrected event information).

Figure 22:
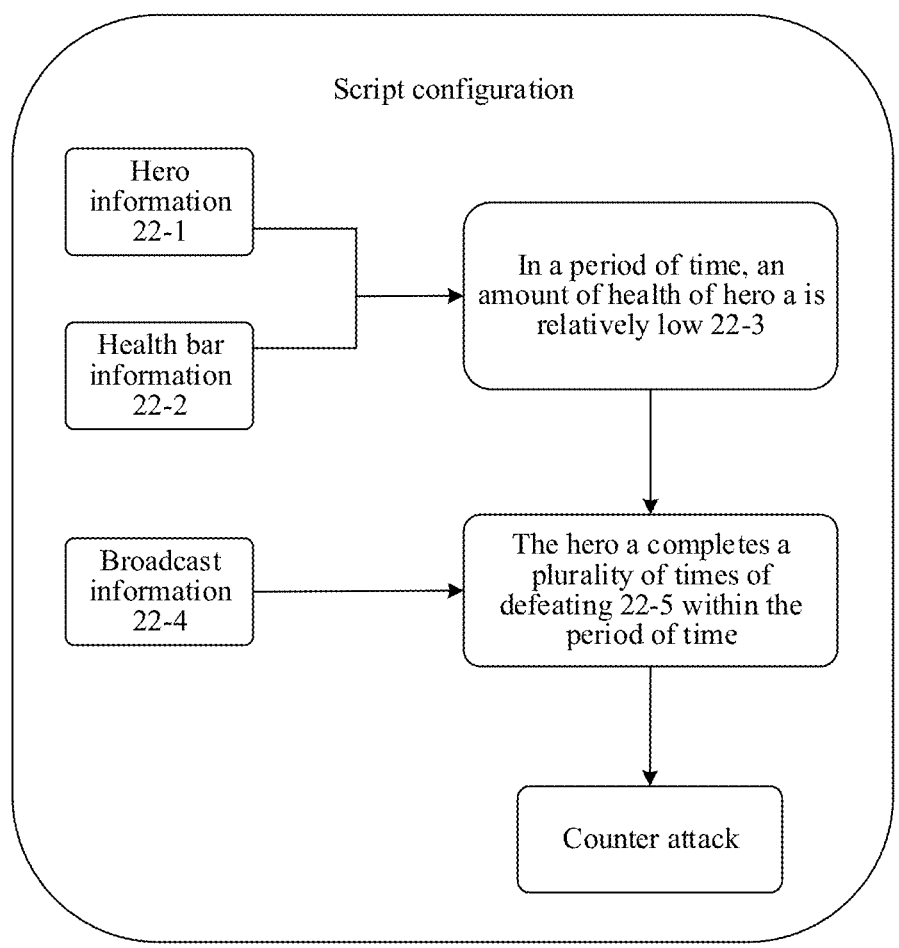
FIG. 22 is an exemplary diagram of a script configuration of a counter attack event according to an embodiment of this application.
Figure 23:
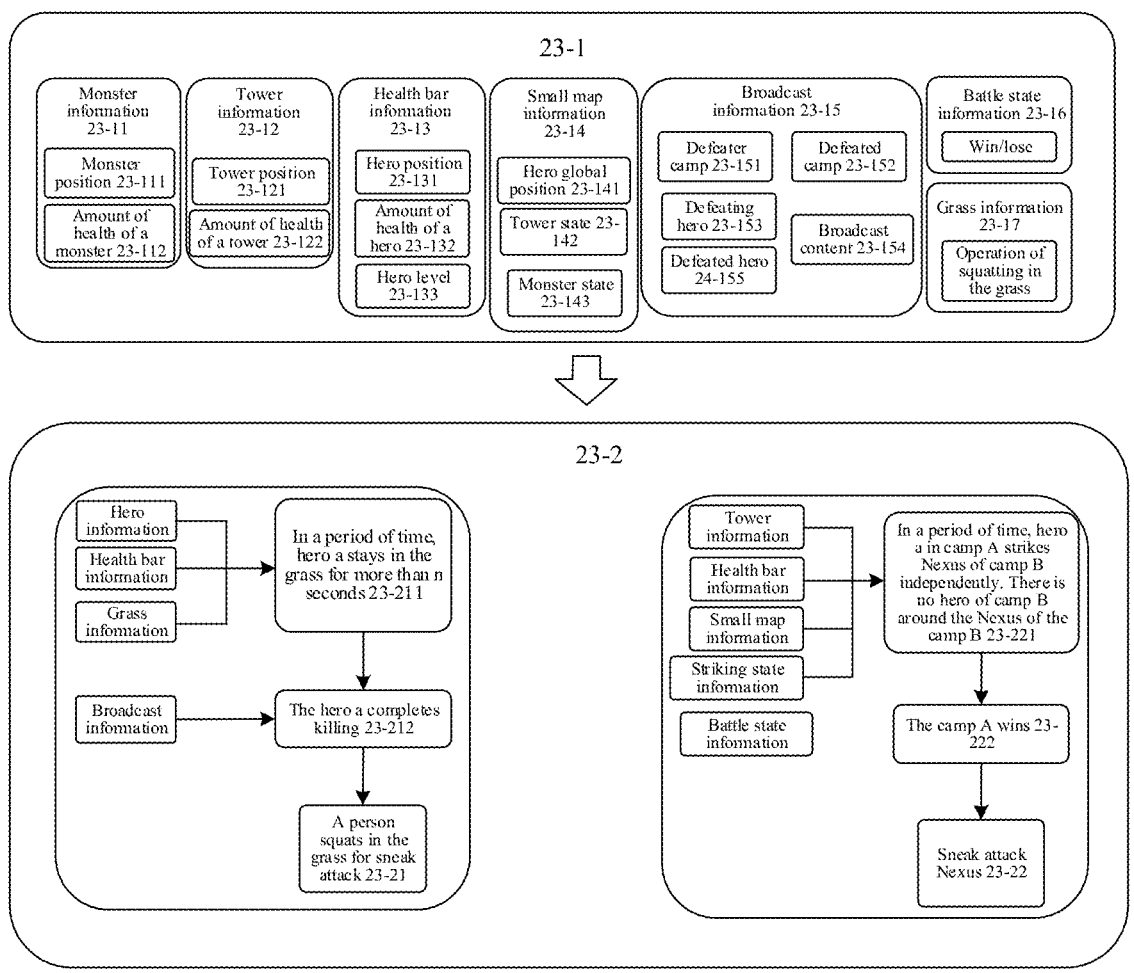
FIG. 23 is an exemplary diagram of structured information item and script construction according to an embodiment of this application.

During script editing 17-31, all events in the game video 17-13 may be split into: a time, a location, a task, a condition, a behavior, and a consequence. FIG. 22 is an exemplary diagram of a script configuration of a counter attack event according to an embodiment of this application. A "counter attack" event is used as an example, and the event describes that when an amount of health of a hero is lower than 30%, the hero kills opponent heroes large than or equal to two continuously. According to the analysis, a script configuration shown in FIG. 22 may be constructed. The server determines whether an amount of health of hero a is relatively low 22-3 within a period of time according to hero information 22-1 and health bar information 22-2, and then determines, according to broadcast information 22-4, whether the hero a completes a plurality of times of defeating 22-5 within the period of time. If an event meets the conditions, the event is the counter attack event. Similarly, when information needs to be built for an event, a time, a location, a task, a condition, a behavior, and a consequence may be analyzed, and corresponding video structure information items are found, and a script is configured, to complete script event detection. FIG. 23 is an exemplary diagram of structured information item and script construction according to an embodiment of this application. In a region 23-1, basic element information extracted from video frames includes: monster information 23-11, that is, a monster position 23-111 and an amount of health of a monster 23-112; tower information 23-12, that is, a tower position 23-121 and an amount of health of a tower 23-122; health bar information 23-13, that is, a hero position 23-131, an amount of health of a hero 23-132, and a hero level 23-133; small map information 23-14, that is, a global hero position 23-141, a tower state 23-142, and a monster state 23-143; broadcast information 23-15, that is, a defeater camp 23-151, a defeated camp 23-152, a defeating hero 23-153, broadcast content 23-154, and a defeated hero 23-155; battle state information 23-16, that is, winning or losing; and grass information 23-17, that is, an operation of squatting in the grass. The server may configure a script according to the information, to obtain a script configuration (a plot trigger condition) in a display region 23-2, that is, determine, according to the hero information, the health bar information, and the grass information, that the hero a stays in the grass for more than n seconds 23-211 within a period of time, determine, according to the broadcast information, that the hero a completes killing 23-212, to obtain a script that a person squats in the grass for sneak attack 23-21; determine, according to the tower information, the health bar information, the small map information, and the striking state information, that the hero a in camp A strikes Nexus of camp B independently within a period of time and there is no here of the camp B around the Nexus of the camp B 23-221, and determine, according to the battle state information, that the camp A wins 23-222, to obtain a script of sneak attacking Nexus 23-22.

During event recalling 17-33, when the basic element information triggers a condition set in the script, a corresponding semantic tag (a plot labeling tag of a first clip) may be outputted, and a video clip (the first clip) is captured, to complete information extraction process of a game video.

In the foregoing manner, the server can extract basic element information from a video picture of a game video in an image processing manner, and capture a video clip from the game video according to a set script configuration and the basic element information, thereby improving video labeling efficiency.

The following continues to describe an exemplary structure of a video labeling apparatus 255 provided by the embodiments of this application implemented as software modules. In some embodiments, as shown in FIG. 2, the software modules stored in the video labeling apparatus 255 of the first memory 250 may include:

a first receiving module 2551, configured to receive a video extraction instruction transmitted by a terminal and obtain a to-be-extracted video according to the video extraction instruction;

an extraction module 2552, configured to extract event information from video frames of the to-be-extracted video, the event information representing basic elements forming plot content of the to-be-extracted video;

an information flow generation module 2553, configured to form at least one event information flow by using the event information; and a capturing module 2554, configured to capture, based on the at least one event information flow, at least one first clip that meets a plot trigger condition from the to-be-extracted video and obtain a plot labeling tag of the at least one first clip, the plot labeling tag being used for labeling the at least one first clip.

In some embodiments of this application, the video labeling apparatus 255 further includes: a first transmitting module 2555.

The first transmitting module 2555 is configured to transmit the at least one first clip and the corresponding plot labeling tag to the terminal, so that the terminal labels the corresponding at least one first clip by using the plot labeling tag and displays obtained labeled information and the corresponding at least one first clip, to complete video labeling for the to-be-extracted video.

In some embodiments of this application, the capturing module 2554 is configured to extract, from the at least one event information flow, an event information flow that meets the plot trigger condition as at least one target event information flow, the plot trigger condition being a condition representing wonderful plot content; and capture, according to each target event information flow in the at least one target event information flow, the at least one first clip from the to-be-extracted video, and obtain the plot labeling tag of the at least one first clip according to the plot trigger condition.

In some embodiments of this application, the capturing module 2554 is configured to determine a start video frame and an end video frame for each target event information flow, the start video frame being corresponding to a video frame in which a target event information flow starts, and the end video frame being corresponding to a video frame in which the target event information flow ends; use a playing moment corresponding to the start video frame as a first clip start time point, and use a playing moment corresponding to the end video frame as a first clip end time point; capture the at least one first clip from the to-be-extracted video according to the first clip start time point and the first clip end time point; and use a plot tag corresponding to the plot trigger condition as the plot labeling tag.

In some embodiments of this application, the video labeling apparatus 255 further includes: a parsing module 2556.

The parsing module 2556 is configured to extract at least one initial video frame from the to-be-extracted video; crop each initial video frame in the at least one initial video frame, to obtain at least one intermediate video frame; and recognize at least one to-be-processed video frame from the at least one intermediate video frame.

Correspondingly, the extraction module 2552, is configured to extract the event information from each to-be-processed video frame of the at least one to-be-processed video frame.

In some embodiments of this application, the extraction module 2552 is configured to match one or more first event information from the video frames by using a preset matching template, the first event information representing event information obtained through template matching; perform feature extraction on the video frames, to obtain video image feature points, matches the video image feature points with feature points extracted from preset images, to obtain one or more second event information, the second event information representing event information obtained through feature point matching, and the video image feature points representing points for describing image features in the video frames; extract one or more third event information from the video frames by using a preset event detection model, the third event information representing event information obtained through model extraction; and integrate the one or more first event information, the one or more second event information, and the one or more third event information, to obtain the event information.

In some embodiments of this application, the parsing module 2556 is configured to obtain a playing frame rate of the to-be-extracted video; perform approximate processing on the playing frame rate, to obtain an approximate playing frame rate; proportionate the approximate playing frame rate to a preset frame extraction frequency, to obtain a frame extraction interval, the preset frame extraction frequency representing a quantity of video frames to be extracted per second; and decompose the to-be-extracted video into full video frames, and extract the at least one initial video frame from the full video frames according to the frame extraction interval, the full video frames representing all video frames forming the to-be-extracted video.

In some embodiments of this application, the parsing module 2556 is configured to perform edge detection on each initial video frame in the at least one initial video frame, to obtain a video playing edge, the video playing edge representing an edge for separating a video playing region and a non-video playing region; crop each initial video frame into a video playing part and a non-video playing part according to the video playing edge; and integrate the video playing part corresponding to each initial video frame, to obtain the at least one intermediate video frame.

In some embodiments of this application, the parsing module 2556 is configured to perform feature extraction on each intermediate video frame in the at least one intermediate video frame, to obtain to-be-classified features; classify the to-be-classified features, to obtain a classification result corresponding to each intermediate video frame; and recognize the at least one to-be-processed video frame from the at least one intermediate video frame according to the classification result.

In some embodiments of this application, the parsing module 2556 is configured to perform feature rearrangement on each to-be-processed video frame in the at least one to-be-processed video frame, to obtain at least one downscaled video frame; generate a feature map for each downscaled video frame in the at least one downscaled video frame, to obtain at least one feature map, the feature map having an image feature of the downscaled video frame; enlarge a size of each feature map in the at least one feature map, to obtain at least one enlarged feature map; and construct, by using the at least one enlarged feature map and the at least one to-be-processed video frame, at least one to-be-processed video frame of which a resolution has been enhanced, the at least one to-be-processed video frame of which a resolution has been enhanced being used for extracting the event information.

In some embodiments of this application, the video labeling apparatus 255 further includes: a correction module 2557.

The correction module 2557 is configured to obtain adjacent video frames of a current video frame from the video frames of the to-be-extracted video, the current video frame being any video frame in the video frames of the to-be-extracted video; perform statistics on event information in the adjacent video frames, to obtain a statistical result; correct event information of the current video frame according to the statistical result, to obtain one or more corrected event information of the current video frame, and obtain one or more corrected event information when event information of all the video frames of the to-be-extracted video is corrected, the one or more corrected event information being used for forming the at least one event information flow.

In some embodiments of this application, the video labeling apparatus 255 further includes: a structured module 2558.

The structured module 2558 is configured to perform structured arrangement on the event information, to obtain and store structured event information corresponding to the video frames.

The following continues to describe an exemplary structure of a video labeling display apparatus 455 provided by the embodiments of this application implemented as software modules. In some embodiments, as shown in FIG. 3, the software modules stored in the video labeling display apparatus 455 of the second memory 450 may include:

a second transmitting module 4551, configured to transmit a video extraction instruction to a server, the video extraction instruction specifying a to-be-extracted video on which video labeling is performed;

a second receiving module 4552, configured to receive at least one first clip and a corresponding plot labeling tag transmitted by the server, the at least one first clip and the plot labeling tag being obtained by the server in response to the video extraction instruction;

an obtaining module 4553, configured to obtain labeled information of the at least one first clip, the labeled information being obtained by correspondingly labeling the at least one first clip by using the plot labeling tag; and a display module 4554, configured to display the labeled information in a display region when the to-be-extracted video is displayed, the display region being a first preset region in a display interface for displaying the to-be-extracted video.

In some embodiments of this application, the second receiving module 4552 is configured to receive a video clip playing instruction for sub-labeled information in the labeled information in the display region.

The display module 4554 is configured to play a target first clip corresponding to the sub-labeled information in a video clip playing region in response to the video clip playing instruction, the video clip playing region being a second preset region located in the display interface and not covering the first preset region, and the target first clip being a first clip corresponding to the sub-labeled information in the at least one first clip.

The embodiments of this application provide a computer-readable storage medium storing executable instructions, storing executable video labeling instructions, the executable video labeling instructions, when being executed by a first processor, implementing the video labeling method provided by a server side according to the embodiments of this application, for example, the method shown in FIG. 4, or the executable video labeling instructions, when being executed by a second processor, implementing the video labeling method provided by a terminal side according to the embodiments of this application.

In some embodiments, the computer-readable storage medium may be a memory such as an FRAM, a ROM, a PROM, an EPROM, an EEPROM, a flash memory, a magnetic memory, a compact disc, or a CD-ROM; or may be various devices including one of or any combination of the foregoing memories.

In some embodiments, the executable video labeling instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

In an example, the executable video labeling instructions may, but do not necessarily, correspond to a file in a file system, and may be stored in a part of a file that saves another program or other data, for example, be stored in one or more scripts in a HyperText Markup Language (HTML) file, stored in a file that is specially used for a program in discussion, or stored in the plurality of collaborative files (for example, be stored in files of one or modules, subprograms, or code parts).

In an example, the executable video labeling instructions can be deployed for execution on one computing device, execution on a plurality of computing devices located at one location, or execution on a plurality of computing devices that are distributed at a plurality of locations and that are interconnected through a communication network.

The foregoing descriptions are merely embodiments of this application and are not intended to limit the protection scope of this application. Any modification, equivalent replacement, or improvement made without departing from the spirit and range of this application shall fall within the protection scope of this application.

INDUSTRIAL APPLICABILITY

In this embodiment of this application, because the server can recognize, by using image content in video frames of a to-be-extracted video, wonderful clips that meet condition from the to-be-extracted video, and capture and label the wonderful clips, to improve video labeling efficiency.

What is claimed is:

1. A computer-implemented method, comprising:
receiving, by a server, a video request transmitted by a terminal, and obtaining a to-be-extracted video according to the video request;
extracting, by the server, one or more initial video frames from the to-be-extracted video;
cropping, by the server, each initial video frame in the one or more initial video frames, to obtain one or more intermediate video frames;
recognizing, by the server, one or more to-be-processed video frames from the one or more intermediate video frames;
extracting, by the server, event information from the one or more to-be-processed video frames of the to-be-extracted video, the event information representing basic elements forming plot content of the to-be-extracted video;
forming, by the server, at least one event information flow by using the event information;
capturing, by the server based on the at least one event information flow, at least one first clip that meets a plot trigger condition from the to-be-extracted video, and obtaining a plot labeling tag of the at least one first clip, the plot labeling tag being used for labeling the at least one first clip; and
transmitting, by the server, the at least one first clip and the corresponding plot labeling tag to the terminal, wherein the terminal displays the at least one first clip and the corresponding plot labeling tag in a preset display region of a display interface in which the to-be-extracted video is displayed.

2. The method according to claim 1, wherein the capturing, by the server based on the at least one event information flow, at least one first clip that meets a plot trigger condition from the to-be-extracted video, and obtaining a plot labeling tag of the at least one first clip comprises:
extracting, by the server from the at least one event information flow, an event information flow that meets the plot trigger condition as at least one target event information flow, the plot trigger condition being a condition representing wonderful plot content; and
capturing, by the server according to each target event information flow in the at least one target event information flow, the at least one first clip from the to-be-extracted video, and obtaining the plot labeling tag of the at least one first clip according to the plot trigger condition.

3. The method according to claim 2, wherein the capturing, by the server according to each target event information flow in the at least one target event information flow, the at least one first clip from the to-be-extracted video, and obtaining the plot labeling tag of the at least one first clip according to the plot trigger condition comprises:
determining, by the server, a start video frame and an end video frame for each target event information flow, the start video frame being corresponding to a video frame in which a target event information flow starts, and the end video frame being corresponding to a video frame in which the target event information flow ends;
using, by the server, a playing moment corresponding to the start video frame as a first clip start time point, and using a playing moment corresponding to the end video frame as a first clip end time point;
capturing, by the server, the at least one first clip from the to-be-extracted video according to the first clip start time point and the first clip end time point; and
using, by the server, a plot tag corresponding to the plot trigger condition as the plot labeling tag.

4. The method according to claim 1, wherein the extracting, by the server, event information from the one or more to be processed video frames of the to-be-extracted video comprises:
extracting, by the server, the event information from each to-be-processed video frame in the one or more to-be-processed video frames.

5. The method according to claim 1, wherein the extracting, by the server, at least one initial video frame from the to-be-extracted video comprises:
obtaining, by the server, a playing frame rate of the to-be-extracted video;
performing, by the server, approximate processing on the playing frame rate, to obtain an approximate playing frame rate;
proportionating, by the server, the approximate playing frame rate to a preset frame extraction frequency, to obtain a frame extraction interval, the preset frame extraction frequency representing a quantity of video frames to be extracted per second; and
decomposing, by the server, the to-be-extracted video into full video frames, and extracting at least one initial video frame from the full video frames according to the frame extraction interval, the full video frames representing all video frames forming the to-be-extracted video.

6. The method according to claim 1, wherein the cropping, by the server, each initial video frame in the one or more initial video frames, to obtain one or more intermediate video frames comprises:
performing, by the server, edge detection on each initial video frame in one or more initial video frames, to obtain a video playing edge, the video playing edge representing an edge for separating a video playing region and a non-video playing region;
cropping, by the server, each initial video frame into a video playing part and a non-video playing part according to the video playing edge; and
integrating, by the server, the video playing part corresponding to each initial video frame, to obtain the one or more intermediate video frames.

7. The method according to claim 1, wherein the recognizing, by the server, the one or more to-be-processed video frames from the one or more intermediate video frames comprises:
performing, by the server, feature extraction on each intermediate video frame in the one or more intermediate video frames, to obtain to-be-classified features;
classifying, by the server, the to-be-classified features, to obtain a classification result corresponding to each intermediate video frame; and
recognizing, by the server, the one or more to-be-processed video frames from the one or more intermediate video frames according to the classification result.

8. The method according to claim 1, wherein after the recognizing, by the server, the one or more to-be-processed video frames from the one or more intermediate video frames, the method further comprises:
performing, by the server, feature rearrangement on each to-be-processed video frame in the one or more to-be-processed video frames, to obtain at least one downscaled video frame;
generating, by the server, a feature map for each downscaled video frame in the at least one downscaled video frame, to obtain at least one feature map, the feature map having an image feature of the downscaled video frame;
enlarging, by the server, a size of each feature map in the at least one feature map, to obtain at least one enlarged feature map; and
constructing, by the server by using the at least one enlarged feature map and the one or more to-be-processed video frames, the one or more to-be-processed video frames of which a resolution have been enhanced, the one or more to-be-processed video frames of which a resolution have been enhanced being used for extracting the event information.

9. The method according to claim 1, wherein after the extracting, by the server, event information from the one or more to-be-processed video frames of the to-be-extracted video, and before the forming, by the server, at least one event information flow by using the event information, the method further comprises:
obtaining, by the server, adjacent video frames of a current video frame from video frames including the one or more to-be-processed video frames of the to-be-extracted video, the current video frame being any video frame in the video frames of the to-be-extracted video;
performing, by the server, statistics on event information in the adjacent video frames, to obtain a statistical result; and
correcting, by the server, event information of the current video frame according to the statistical result, to obtain one or more corrected event information of the current video frame, and obtaining one or more corrected event information when event information of all the video frames of the to-be-extracted video is corrected, the one or more corrected event information being used for forming the one event information flow.

10. The method according to claim 1, wherein after the extracting, by the server, event information from the one or more to-be-processed video frames of the to-be-extracted video, the method further comprises:
performing, by the server, structured arrangement on the event information, to obtain and store structured event information corresponding to the one or more to-be-processed video frames.

11. A server, comprising:
a memory, configured to store executable video labeling instructions; and
a processor, configured to implement, when executing the executable video labeling instructions stored in the memory, a plurality of operations including:
receiving a video request transmitted by a terminal, and obtaining a to-be-extracted video according to the video request;
extracting one or more initial video frames from the to-be-extracted video;
cropping each initial video frame in the one or more initial video frames, to obtain one or more intermediate video frames;
recognizing one or more to-be-processed video frames from the one or more intermediate video frames;
extracting event information from the one or more to-be-processed video frames of the to-be-extracted video, the event information representing basic elements forming plot content of the to-be-extracted video;
forming at least one event information flow by using the event information;
capturing, based on the at least one event information flow, at least one first clip that meets a plot trigger condition from the to-be-extracted video, and obtaining a plot labeling tag of the at least one first clip, the plot labeling tag being used for labeling the at least one first clip; and
transmitting the at least one first clip and the corresponding plot labeling tag to the terminal, wherein the terminal displays the at least one first clip and the corresponding plot labeling tag in a preset display region of a display interface in which the to-be-extracted video is displayed.

12. The server according to claim 11, wherein the capturing, based on the at least one event information flow, at least one first clip that meets a plot trigger condition from the to-be-extracted video, and obtaining a plot labeling tag of the at least one first clip comprises:
extracting, from the at least one event information flow, an event information flow that meets the plot trigger condition as at least one target event information flow, the plot trigger condition being a condition representing wonderful plot content; and
capturing, according to each target event information flow in the at least one target event information flow, the at least one first clip from the to-be-extracted video, and obtaining the plot labeling tag of the at least one first clip according to the plot trigger condition.

13. The server according to claim 12, wherein the capturing, according to each target event information flow in the at least one target event information flow, the at least one first clip from the to-be-extracted video, and obtaining the plot labeling tag of the at least one first clip according to the plot trigger condition comprises:
determining a start video frame and an end video frame for each target event information flow, the start video frame being corresponding to a video frame in which a target event information flow starts, and the end video frame being corresponding to a video frame in which the target event information flow ends;
using a playing moment corresponding to the start video frame as a first clip start time point, and using a playing moment corresponding to the end video frame as a first clip end time point;
capturing the at least one first clip from the to-be-extracted video according to the first clip start time point and the first clip end time point; and
using a plot tag corresponding to the plot trigger condition as the plot labeling tag.

14. The server according to claim 11,
wherein the extracting the event information from the one or more to-be-processed video frames of the to-be-extracted video comprises:
extracting the event information from each to-be-processed video frame in the one or more to-be-processed video frames.

15. The server according to claim 11, wherein the plurality of operations further comprise:
before forming at least one event information flow by using the event information:
obtaining adjacent video frames of a current video frame from video frames including the one or more to-be-processed video frames of the to-be-extracted video, the current video frame being any video frame in the video frames of the to-be-extracted video;
performing statistics on event information in the adjacent video frames, to obtain a statistical result; and correcting event information of the current video frame according to the statistical result, to obtain one or more corrected event information of the current video frame, and obtaining one or more corrected event information when event information of all the video frames of the to-be-extracted video is corrected, the one or more corrected event information being used for forming the at least one event information flow.

16. A non-transitory computer-readable storage medium, storing executable video labeling instructions, the executable video labeling instructions, when executed by a processor of a server, causing the server to perform a plurality of operations including:
    receiving a video request transmitted by a terminal, and obtaining a to-be-extracted video according to the video request;
    extracting one or more initial video frames from the to-be-extracted video;
    cropping each initial video frame in the one or more initial video frames, to obtain one or more intermediate video frames;
    recognizing one or more to-be-processed video frames from the one or more intermediate video frames;
    extracting event information from the one or more to-be-processed video frames of the to-be-extracted video, the event information representing basic elements forming plot content of the to-be-extracted video;
    forming at least one event information flow by using the event information;
    capturing, based on the at least one event information flow, at least one first clip that meets a plot trigger condition from the to-be-extracted video, and obtaining a plot labeling tag of the at least one first clip, the plot labeling tag being used for labeling the at least one first clip; and
    transmitting the at least one first clip and the corresponding plot labeling tag to the terminal, wherein the terminal displays the at least one first clip and the corresponding plot labeling tag in a preset display region of a display interface in which the to-be-extracted video is displayed.

17. The non-transitory computer-readable storage medium according to claim 16, wherein the capturing, based on the at least one event information flow, at least one first clip that meets a plot trigger condition from the to-be-extracted video, and obtaining a plot labeling tag of the at least one first clip comprises:
    extracting, from the at least one event information flow, an event information flow that meets the plot trigger condition as at least one target event information flow, the plot trigger condition being a condition representing wonderful plot content; and
    capturing, according to each target event information flow in the at least one target event information flow, the at least one first clip from the to-be-extracted video, and obtaining the plot labeling tag of the at least one first clip according to the plot trigger condition.

18. The non-transitory computer-readable storage medium according to claim 17, wherein the capturing, according to each target event information flow in the at least one target event information flow, the at least one first clip from the to-be-extracted video, and obtaining the plot labeling tag of the at least one first clip according to the plot trigger condition comprises:
    determining a start video frame and an end video frame for each target event information flow, the start video frame being corresponding to a video frame in which a target event information flow starts, and the end video frame being corresponding to a video frame in which the target event information flow ends;
    using a playing moment corresponding to the start video frame as a first clip start time point, and using a playing moment corresponding to the end video frame as a first clip end time point;
    capturing the at least one first clip from the to-be-extracted video according to the first clip start time point and the first clip end time point; and
    using a plot tag corresponding to the plot trigger condition as the plot labeling tag.

19. The non-transitory computer-readable storage medium according to claim 16,
    wherein the extracting the event information from the one or more to-be-processed video frames of the to-be-extracted video comprises:
        extracting the event information from each to-be-processed video frame in the one or more to-be-processed video frames.

20. The non-transitory computer-readable storage medium according to claim 16, wherein the plurality of operations further comprise:
    before forming at least one event information flow by using the event information:
        obtaining adjacent video frames of a current video frame from video frames including the one or more to-be-processed video frames of the to-be-extracted video, the current video frame being any video frame in the video frames of the to-be-extracted video;
        performing statistics on event information in the adjacent video frames, to obtain a statistical result; and
        correcting event information of the current video frame according to the statistical result, to obtain one or more corrected event information of the current video frame, and obtaining one or more corrected event information when event information of all the video frames of the to-be-extracted video is corrected, the one or more corrected event information being used for forming the at least one event information flow.

* * * * *